(12) United States Patent
Shiffman et al.

(10) Patent No.: US 9,881,062 B2
(45) Date of Patent: Jan. 30, 2018

(54) OPERATION AND METHOD FOR PREDICTION AND MANAGEMENT OF THE VALIDITY OF SUBJECT REPORTED DATA

(71) Applicant: eResearchTechnology, Inc., Philadelphia, PA (US)

(72) Inventors: Saul Shiffman, Pittsburgh, PA (US); Douglas R. Engfer, Santa Cruz, CA (US); Jean A. Paty, Pittsburgh, PA (US)

(73) Assignee: eResearch Technology, Inc., Philadelphia, PA (US)

( * ) Notice: Subject to any disclaimer, the term of this patent is extended or adjusted under 35 U.S.C. 154(b) by 0 days.

(21) Appl. No.: 14/792,126

(22) Filed: Jul. 6, 2015

(65) Prior Publication Data
US 2016/0034541 A1 Feb. 4, 2016

Related U.S. Application Data

(63) Continuation of application No. 12/965,719, filed on Dec. 10, 2010, now Pat. No. 9,129,215, which is a (Continued)

(51) Int. Cl.
*G06F 17/00* (2006.01)
*G06N 5/02* (2006.01)
*G06F 17/30* (2006.01)

(52) U.S. Cl.
CPC .. *G06F 17/30539* (2013.01); *G06F 17/30528* (2013.01); *G06N 5/02* (2013.01); *G06N 5/025* (2013.01)

(58) Field of Classification Search
CPC ............. G06N 5/02; G06N 5/04; G06N 5/027
(Continued)

(56) References Cited

U.S. PATENT DOCUMENTS

| | | |
|---|---|---|
| D247,251 S | 2/1978 | Napoli |
| 4,262,632 A | 4/1981 | Hanton et al. |
| | (Continued) | |

FOREIGN PATENT DOCUMENTS

| | | |
|---|---|---|
| EP | 0299667 A1 | 1/1989 |
| EP | 1034734 A1 | 9/2000 |
| | (Continued) | |

OTHER PUBLICATIONS

Rule based clinical decision support system for hematological disorder Y. Y. Chen; K. N. Goh; K. Chong 2013 IEEE 4th International Conference on Software Engineering and Service Science Year: 2013 pp. 43-48, DOI: 10.1109/ICSESS.2013.6615252 IEEE Conference Publications.*

(Continued)

*Primary Examiner* — Michael B Holmes
(74) *Attorney, Agent, or Firm* — Wilson Sonsini Goodrich & Rosati

(57) ABSTRACT

A system for developing and implementing empirically derived algorithms to generate decision rules to predict invalidity of subject reported data and fraud with research protocols in surveys allows for the identification of complex patterns of variables that detect or predict subject invalidity of subject reported data and fraud with the research protocol in the survey. The present invention may also be used to monitor invalidity of subject reported data within a research protocol to determine preferred actions to be performed. Optionally, the invention may provide a spectrum of invalidity, from minor invalidity needing only corrective feedback, to significant invalidity requiring subject removal from the survey. The algorithms and decision rules can also be domain-specific, such as detecting invalidity or fraud among subjects in a workplace satisfaction survey, or demographically specific, such as taking into account gender or (Continued)

age. The algorithms and decision rules may be optimized for the specific sample of subjects being studied.

42 Claims, 3 Drawing Sheets

Related U.S. Application Data continuation of application No. 11/844,632, filed on Aug. 24, 2007, now Pat. No. 7,873,589, which is a continuation-in-part of application No. 11/002,046, filed on Dec. 1, 2004, now abandoned, which is a continuation of application No. 09/825,534, filed on Apr. 2, 2001, now Pat. No. 6,879,970.

(58) Field of Classification Search
USPC .......................................................... 706/47
See application file for complete search history.

(56) References Cited

U.S. PATENT DOCUMENTS

| | | | |
|---|---|---|---|
| 4,343,375 A | 8/1982 | Manning | |
| 4,353,375 A | 10/1982 | Colburn et al. | |
| 4,367,752 A | 1/1983 | Jimenez et al. | |
| 4,543,955 A | 10/1985 | Schroeppel | |
| 4,566,461 A | 1/1986 | Lubell et al. | |
| 4,592,018 A | 5/1986 | Wiegman | |
| 4,686,624 A | 8/1987 | Blum | |
| 4,803,625 A | 2/1989 | Fu et al. | |
| 4,841,986 A * | 6/1989 | Marchbanks | A61B 5/121 |
| | | | 600/559 |
| 4,844,076 A | 7/1989 | Lesho et al. | |
| 4,883,063 A | 11/1989 | Bernard et al. | |
| 4,909,260 A | 3/1990 | Salem et al. | |
| 4,918,627 A | 4/1990 | Garcia et al. | |
| 4,966,154 A | 10/1990 | Cooper et al. | |
| 4,974,601 A | 12/1990 | Tranjan et al. | |
| 4,975,842 A | 12/1990 | Darrow et al. | |
| 4,987,897 A | 1/1991 | Funke | |
| 5,002,064 A | 3/1991 | Allain et al. | |
| 5,063,937 A | 11/1991 | Ezenwa et al. | |
| 5,078,134 A | 1/1992 | Heilman et al. | |
| 5,111,818 A | 5/1992 | Suzuki et al. | |
| 5,113,859 A | 5/1992 | Funke | |
| 5,128,552 A | 7/1992 | Fang et al. | |
| 5,131,390 A | 7/1992 | Sakaguchi et al. | |
| 5,137,345 A | 8/1992 | Waldorf et al. | |
| 5,181,519 A | 1/1993 | Bible | |
| 5,197,489 A | 3/1993 | Conlan | |
| 5,199,439 A | 4/1993 | Zimmerman et al. | |
| 5,213,106 A | 5/1993 | Lerner | |
| 5,213,555 A | 5/1993 | Hood et al. | |
| 5,218,969 A | 6/1993 | Bredesen et al. | |
| 5,222,503 A | 6/1993 | Ives et al. | |
| 5,226,424 A | 7/1993 | Bible | |
| 5,226,539 A | 7/1993 | Cheng | |
| 5,228,450 A | 7/1993 | Sellers | |
| 5,243,998 A | 9/1993 | Silverman et al. | |
| 5,253,654 A | 10/1993 | Thomas et al. | |
| 5,261,412 A | 11/1993 | Butterfield et al. | |
| 5,271,405 A | 12/1993 | Boyer et al. | |
| 5,275,159 A | 1/1994 | Griebel | |
| 5,280,429 A | 1/1994 | Withers | |
| 5,289,824 A | 3/1994 | Mills et al. | |
| 5,307,262 A | 4/1994 | Ertel | |
| 5,307,263 A | 4/1994 | Brown | |
| 5,412,769 A | 5/1995 | Maruoka et al. | |
| 5,447,164 A | 9/1995 | Shaya et al. | |
| 5,454,376 A | 10/1995 | Stephens et al. | |
| 5,479,339 A | 12/1995 | Miller | |
| 5,547,878 A | 8/1996 | Kell | |
| 5,583,831 A | 12/1996 | Churchill et al. | |
| 5,596,994 A | 1/1997 | Bro | |
| 5,652,146 A | 7/1997 | Kell | |
| 5,671,734 A | 9/1997 | Pugh | |
| 5,672,154 A | 9/1997 | Sillen et al. | |
| 5,704,366 A | 1/1998 | Tacklind et al. | |
| 5,710,551 A | 1/1998 | Ridgeway | |
| 5,732,709 A | 3/1998 | Tacklind et al. | |
| 5,778,882 A | 7/1998 | Raymond et al. | |
| 5,809,997 A | 9/1998 | Wolf | |
| 5,832,448 A | 11/1998 | Brown | |
| 5,898,586 A | 4/1999 | Jeatran et al. | |
| 5,908,788 A | 6/1999 | Kell | |
| 5,960,403 A | 9/1999 | Brown | |
| 5,963,136 A | 10/1999 | O'Brien | |
| 5,980,429 A | 11/1999 | Nashner | |
| 6,029,144 A | 2/2000 | Barrett et al. | |
| 6,039,688 A | 3/2000 | Douglas et al. | |
| 6,051,029 A | 4/2000 | Paterson et al. | |
| 6,063,028 A | 5/2000 | Luciano | |
| 6,075,755 A | 6/2000 | Zarchan | |
| 6,095,985 A | 8/2000 | Raymond et al. | |
| 6,108,635 A | 8/2000 | Herren et al. | |
| 6,151,581 A | 11/2000 | Kraftson et al. | |
| 6,151,586 A | 11/2000 | Brown | |
| 6,165,142 A | 12/2000 | Bar | |
| 6,167,362 A | 12/2000 | Brown et al. | |
| 6,171,237 B1 | 1/2001 | Avitall et al. | |
| 6,282,441 B1 | 8/2001 | Raymond et al. | |
| 6,302,844 B1 | 10/2001 | Walker et al. | |
| 6,317,731 B1 | 11/2001 | Luciano | |
| 6,338,039 B1 | 1/2002 | Lonski et al. | |
| 6,362,440 B1 | 3/2002 | Karidis et al. | |
| 6,381,577 B1 | 4/2002 | Brown | |
| 6,440,069 B1 | 8/2002 | Raymond et al. | |
| 6,514,200 B1 | 2/2003 | Khouri | |
| 6,640,134 B2 | 10/2003 | Raymond et al. | |
| 6,663,846 B1 | 12/2003 | McCombs et al. | |
| 6,687,190 B2 | 2/2004 | Momich et al. | |
| 6,827,670 B1 | 12/2004 | Stark et al. | |
| 6,865,519 B2 | 3/2005 | Lampert et al. | |
| 6,879,970 B2 | 4/2005 | Shiffman et al. | |
| 6,895,405 B1 | 5/2005 | Choi et al. | |
| 6,980,958 B1 | 12/2005 | Surwit et al. | |
| 6,996,560 B1 | 2/2006 | Choi et al. | |
| 7,010,683 B2 * | 3/2006 | Corella | H04L 9/002 |
| | | | 713/156 |
| 7,011,939 B2 | 3/2006 | Trumbull et al. | |
| 7,054,782 B2 | 5/2006 | Hartlaub | |
| 7,058,517 B1 | 6/2006 | Denton et al. | |
| 7,072,802 B2 | 7/2006 | Hartlaub | |
| 7,124,059 B2 | 10/2006 | Wetzer et al. | |
| 7,185,065 B1 | 2/2007 | Holtzman et al. | |
| 7,249,043 B1 | 7/2007 | Trout, II et al. | |
| 7,251,609 B1 | 7/2007 | McAlindon et al. | |
| 7,251,620 B2 | 7/2007 | Walker et al. | |
| 7,273,454 B2 | 9/2007 | Raymond et al. | |
| 7,284,228 B1 | 10/2007 | Haratsaris | |
| 7,311,666 B2 | 12/2007 | Stupp et al. | |
| 7,343,337 B1 | 3/2008 | Cieliebak et al. | |
| 7,415,447 B2 * | 8/2008 | Shiffman | G06F 19/327 |
| | | | 706/45 |
| 7,725,816 B2 | 5/2010 | Cottrille et al. | |
| 7,752,059 B2 | 7/2010 | Sweeney | |
| 7,783,072 B2 | 8/2010 | Work et al. | |
| 7,840,393 B1 | 11/2010 | Whirley et al. | |
| 7,873,589 B2 * | 1/2011 | Shiffman | G06N 5/025 |
| | | | 703/2 |
| 8,065,180 B2 * | 11/2011 | Hufford | G06F 19/325 |
| | | | 705/3 |
| 8,065,347 B1 | 11/2011 | Demeyer et al. | |
| 8,145,519 B2 * | 3/2012 | Hufford | G06F 19/325 |
| | | | 705/3 |
| 8,273,019 B2 | 9/2012 | Crowley et al. | |
| 8,380,531 B2 | 2/2013 | Paty et al. | |
| 8,433,605 B2 * | 4/2013 | Hufford | G06F 19/325 |
| | | | 705/3 |
| 8,533,029 B2 * | 9/2013 | Hufford | G06F 19/363 |
| | | | 705/3 |
| 9,075,900 B2 | 7/2015 | Wilson et al. | |
| 9,129,215 B2 * | 9/2015 | Shiffman | G06N 5/025 |

(56) References Cited

U.S. PATENT DOCUMENTS

| | | | |
|---|---|---|---|
| 9,483,618 | B2 | 11/2016 | Brincat et al. |
| 2001/0044408 | A1 | 11/2001 | Reitberg |
| 2002/0007303 | A1 | 1/2002 | Brookler et al. |
| 2002/0013516 | A1 | 1/2002 | Freyre et al. |
| 2002/0019748 | A1 | 2/2002 | Brown |
| 2002/0042726 | A1 | 4/2002 | Mayaud |
| 2002/0052858 | A1 | 5/2002 | Goldman et al. |
| 2002/0064095 | A1 | 5/2002 | Momich et al. |
| 2002/0082886 | A1* | 6/2002 | Manganaris .......... G06F 21/552 719/318 |
| 2002/0087704 | A1 | 7/2002 | Chesnais et al. |
| 2002/0099570 | A1 | 7/2002 | Knight |
| 2002/0120471 | A1 | 8/2002 | Drazen |
| 2002/0143563 | A1 | 10/2002 | Hufford et al. |
| 2002/0143577 | A1 | 10/2002 | Shiffman et al. |
| 2002/0143595 | A1* | 10/2002 | Frank .................... G06Q 10/06 705/311 |
| 2002/0156640 | A1 | 10/2002 | Hufford et al. |
| 2003/0036683 | A1 | 2/2003 | Kehr et al. |
| 2003/0065669 | A1 | 4/2003 | Kahn et al. |
| 2003/0144874 | A1 | 7/2003 | Barret et al. |
| 2003/0178031 | A1 | 9/2003 | Du Pen et al. |
| 2003/0194704 | A1 | 10/2003 | Penn et al. |
| 2004/0024639 | A1 | 2/2004 | Goldman |
| 2004/0049418 | A1 | 3/2004 | Watanabe et al. |
| 2004/0122701 | A1 | 6/2004 | Dahlin et al. |
| 2004/0215402 | A1 | 10/2004 | Hsiung et al. |
| 2005/0004814 | A1 | 1/2005 | Seltzer |
| 2005/0009862 | A1 | 1/2005 | Sabounjian et al. |
| 2005/0038680 | A1 | 2/2005 | McMahon |
| 2005/0154676 | A1 | 7/2005 | Ronning et al. |
| 2005/0159979 | A1 | 7/2005 | Dickson |
| 2005/0165626 | A1 | 7/2005 | Karpf |
| 2005/0229223 | A1 | 10/2005 | Katagishi et al. |
| 2006/0136267 | A1 | 6/2006 | Brackett et al. |
| 2006/0167346 | A1 | 7/2006 | Sarel |
| 2006/0184493 | A1 | 8/2006 | Shiffman et al. |
| 2007/0106565 | A1 | 5/2007 | Coelho |
| 2007/0149214 | A1 | 6/2007 | Walsh et al. |
| 2007/0179361 | A1 | 8/2007 | Brown et al. |
| 2007/0238936 | A1 | 10/2007 | Becker |
| 2007/0250429 | A1 | 10/2007 | Walser et al. |
| 2008/0004904 | A1 | 1/2008 | Tran |
| 2008/0013701 | A1 | 1/2008 | Barhydt et al. |
| 2008/0013705 | A1 | 1/2008 | Yoffie et al. |
| 2008/0021741 | A1 | 1/2008 | Holla et al. |
| 2008/0052259 | A1 | 2/2008 | Shiffman et al. |
| 2008/0097908 | A1 | 4/2008 | Dicks et al. |
| 2008/0097910 | A1 | 4/2008 | Dicks et al. |
| 2008/0119705 | A1 | 5/2008 | Patel et al. |
| 2008/0154640 | A1 | 6/2008 | Demeyer et al. |
| 2008/0162229 | A1 | 7/2008 | Moore |
| 2008/0228525 | A1 | 9/2008 | Weickert et al. |
| 2009/0281829 | A1 | 11/2009 | Hansen et al. |
| 2009/0318779 | A1 | 12/2009 | Tran |
| 2010/0010358 | A1 | 1/2010 | Boute et al. |
| 2010/0022847 | A1 | 1/2010 | Crowley et al. |
| 2010/0023346 | A1 | 1/2010 | Paty et al. |
| 2010/0029294 | A1 | 2/2010 | Matsuoka |
| 2010/0145730 | A1 | 6/2010 | Abreu |
| 2010/0174558 | A1 | 7/2010 | Smith et al. |
| 2010/0218132 | A1 | 8/2010 | Soni et al. |
| 2010/0228699 | A1 | 9/2010 | Webber et al. |
| 2010/0279718 | A1 | 11/2010 | Borve |
| 2011/0108623 | A1 | 5/2011 | Hammad |
| 2011/0119155 | A1 | 5/2011 | Hammad et al. |
| 2011/0152656 | A1 | 6/2011 | Weinert et al. |
| 2011/0153360 | A1 | 6/2011 | Hanina et al. |
| 2011/0161111 | A1 | 6/2011 | Dicks et al. |
| 2011/0172550 | A1 | 7/2011 | Martin et al. |
| 2011/0202368 | A1 | 8/2011 | Stakutis et al. |
| 2011/0208529 | A1 | 8/2011 | Jeal et al. |
| 2011/0213225 | A1 | 9/2011 | Bernstein et al. |
| 2011/0251469 | A1 | 10/2011 | Varadan |
| 2012/0010518 | A1 | 1/2012 | Sarel |
| 2012/0018506 | A1 | 1/2012 | Hammad et al. |
| 2012/0029940 | A1 | 2/2012 | Hufford et al. |
| 2012/0041767 | A1 | 2/2012 | Hoffman et al. |
| 2012/0041786 | A1 | 2/2012 | Yu |
| 2012/0084210 | A1 | 4/2012 | Farahmand |
| 2012/0232929 | A1 | 9/2012 | Experton |
| 2012/0239414 | A1 | 9/2012 | Hufford et al. |
| 2012/0253847 | A1 | 10/2012 | Dell'Anno et al. |
| 2013/0006671 | A1 | 1/2013 | Hufford et al. |
| 2013/0157244 | A1 | 6/2013 | Eger et al. |
| 2013/0159010 | A1 | 6/2013 | Paty et al. |
| 2013/0159021 | A1 | 6/2013 | Felsher |
| 2013/0268287 | A1 | 10/2013 | Hufford et al. |
| 2014/0108032 | A1 | 4/2014 | Hufford et al. |
| 2015/0178473 | A1 | 6/2015 | Hufford et al. |
| 2015/0178474 | A1 | 6/2015 | Hufford et al. |

FOREIGN PATENT DOCUMENTS

| | | |
|---|---|---|
| FR | 2686497 A1 | 7/1993 |
| WO | WO-8802237 A1 | 4/1988 |
| WO | WO-8905116 A1 | 6/1989 |
| WO | WO-9401040 A1 | 1/1994 |
| WO | WO-9401049 A1 | 1/1994 |
| WO | WO-9413198 A1 | 6/1994 |
| WO | WO-9424929 A1 | 11/1994 |
| WO | WO-9613790 A1 | 5/1996 |
| WO | WO-9625877 A2 | 8/1996 |
| WO | WO-9838909 A1 | 9/1998 |
| WO | WO-9927483 A1 | 6/1999 |
| WO | WO-9938052 A1 | 7/1999 |
| WO | WO-0015103 A1 | 3/2000 |
| WO | WO-0069331 A1 | 11/2000 |
| WO | WO-0075748 A2 | 12/2000 |
| WO | WO-0106433 A1 | 1/2001 |
| WO | WO-0109701 A1 | 2/2001 |
| WO | WO-0075748 A3 | 4/2001 |
| WO | WO-0126020 A1 | 4/2001 |
| WO | WO-0126021 A1 | 4/2001 |
| WO | WO-0134024 A1 | 5/2001 |
| WO | WO-0174229 A2 | 10/2001 |
| WO | WO-0178345 A1 | 10/2001 |
| WO | WO-0219247 A2 | 3/2002 |
| WO | WO-0174229 A3 | 5/2002 |
| WO | WO-0219247 A3 | 11/2003 |
| WO | WO-2006009331 A1 | 1/2006 |
| WO | WO-2008001295 A2 | 1/2008 |
| WO | WO-2008001295 A3 | 2/2008 |

OTHER PUBLICATIONS

Multi-sensor Visual Analytics Supported by Machine-Learning Models Geetika Sharma; Gautam Shroff; Aditeya Pandey; Brijendra Singh; Gunjan Sehgal; Kaushal Paneri; Puneet Agarwal 2015 IEEE International Conference on Data Mining Workshop (ICDMW) Year: 2015 pp. 668-674, DOI: 10.1109/ICDMW.2015.190 IEEE Conference Publications.*

Mining for Implications in Medical Data C. L. Bethel; L. O. Hall; D. Goldgof 18th International Conference on Pattern Recognition (ICPR'06) Year: 2006, vol. 1 pp. 1212-1215, DOI: 10.1109/ICPR. 2006.800 IEEE Conference Publications.*

Molecular Diagnosis and Biomarker Identification on SELDI proteomics data by ADTBoost method Lu-yong Wang; A. Chakraborty; D. Comaniciu 2005 IEEE Engineering in Medicine and Biology 27th Annual Conference Year: 2005 pp. 4771-4774, DOI: 10.1109/IEMBS.2005.1615538 IEEE Conference Publications.*

Alwan, et al. A Smart and Passive Floor-Vibration Based Fall Detector for Elderly. Information and Communication Technologies, 2006. ICTTA '06. 2nd vol. 1, Apr. 24-28, 2006 pp. 1003-1007.

Arzy, et al. Self in time: Imagined self-location influences neural activity related to mental time travel. The Journal of Neuroscience. Jun. 18, 2008; 28(25):6502-6507.

Bradburn, et al. Answering autobiographical questions: the impact of memory and inference on surveys. Science. Apr. 10, 1987;236(4798):157-61.

(56) References Cited

OTHER PUBLICATIONS

Cole, et al. A comparative study of mobile electronic data entry systems for clinical trial data collection. International Journal of Medicinal Informactics. 2006; 75:722-729.
Collins, et al. Ecological momentary assessment in a behavioral drinking moderation training program. Exp. Clin. Psychopharmacol. Aug. 1998;6(3):306-315.
Coons, et al. Recommendations on evidence needed to support measurement equivalence between electronic and paper-based patient-reported outcome (PRO) measures: ISPOR ePRO Good Research Practices Task Force report. Value Health. Jun. 2009;12(4):419-29. Epub Nov. 11, 2008.
Cramer, et al. How often is medication taken as prescribed? JAMA Jun. 9, 1989;261(22):3273-3277.
Dahlstrom et al. Patient Computers to Enhance Compliance with Completing Questionnaires: a Challenge for the 1990s. Patient Compliance in Medical Practice and Clinical Trials (ed. By J.A. Cramer and B. Spilker). New York: Raven Press;1991: 233-40.
Dale, et al. Despite technical problems personal digital assistants outperform pen and paper when collecting patient diary data. Journal of Clinical Epidemiology. 2007; 60:8-17.
Deser, et al. Time travel? Extended version of the talk presented at '46 LNX 46, Cambridge, MA. 1992. p. 1-19.
Dillman, et al. Design effects in the transition to web-based surveys. Am J Prev Med. 2007; 32(5S):S90-96.
Eich, et al. Memory for pain: relation between past and present pain intensity. Pain. Dec. 1985;23(4):375-80.
E-mail dated Sep. 18, 2006 and attached Time Forwarding document.
Engfer, et al. Technology in service of science. Invivodata, Inc. Jan. 30, 2001 (9 pages).
FDA. Guidance for industry. Computerized systems used in clinical investigations. US department of health and human services. May 2007.
Friedman, et al. Memory for the time of past events. Psychological bulletin. 1993, vol. 113, No. 1, pp. 44-66.
Gorin, et al. Recall Biases and Cognitive Errors in Retrospective Self-Reports: A Call for Momentary Assessments. Handbook of Heath Psychology. Lawrence Erlbaum Assoc.:Mahwah, New Jersey. 2001;pp. 405-413.
Greeno, et al. Binge antecedents in obese women with and without binge eating disorder. J. Consult Clin. Psychol. Feb. 2000;68(1):95-102.
Guadadango, et al. Using PDAs for data collection. Applied Nursing Research. Nov. 2004; 17(4):283-291.
Gwaltney, et al. Equivalence of electronic and paper-and-pencil administration of patient-reported outcome measures: a meta-analytic review. Value Health. 2008; 11:322-333.
Hufford, et al. Collecting reliable and valid real-time patient experience data. Drug Information Journal. 2001; 755-765.
Hufford, et al. Correspondence between paper and electronic visual analog scales among adult asthmatics. Invivodata. Nov. 9, 2001.
Hufford, et al. Quality of life and patient experience research. Invivodata, Inc. Jan. 30, 2001 (10 pages).
Hyland, et al. Diary keeping in asthma: comparison of written and electronic methods. BMJ. Feb. 20, 1993;306(6876):487-9.
Invivodata Announcement dated Jun. 13, 2000.
Invivodata. Application brief pain. Apr. 10, 2001 (2 pages).
Invivodata company newsletter dated 4th quarter 2001.
Invivodata company press release dated Apr. 11, 2001: Invivodata leads way in clinical trial technology with wireless patient diary system.
Invivodata company press release dated Jun. 12, 2000: Invivodata delivers new version of patient compliance monitoring.
Invivodata company press release dated Jun. 12, 2000: Invivodata Inc. provides science-based system to measure patient experience.
Invivodata company press release dated Nov. 28, 2000: Invivodata is first to guarantee patient compliance in clinical studies.
Invivodata company press release dated Oct. 12, 2000: Invivodata and RxCCI announce new partnership to improve quality and timeliness of clinical trials.
Invivodata. Comparing electronic and paper diary data. Invivodata. Nov. 26, 2001.
Invivodata. Guaranteed patient compliance. Insight into patient behavior. Reduced study risks. Jul. 2001.
Invivodata, Inc. Insights. Third Issue. Jul. 2001.
Invivodata. Innovations in Clinical Trial Technologies. Schedule for Seminar. 2001.
Invivodata invoice dated Oct. 11, 2006.
Invivodata postcard mail item. 2001.
Invivodata. Prove it—your drug's performance beats the competition. Jul. 2001.
Jamison, et al. Electronic diaries for monitoring chronic pain: 1-year validation study. Pain. Apr. 2001;91(3):277-85.
Kamarck, et al. Effects of task strain, social conflict, and emotional activation on ambulatory cardiovascular activity: daily life consequences of recurring stress in a multiethnic adult sample. Health Psychol. Jan. 17, 1998;(1): 17-29.
Kamarck, et al. Emotional Support Moderates The Acute Pressor Effects of Stress During Daily Life Abstracts of Papers for 1999 Annual Meeting: Paper Session: Cardiovascular Activity in Relation to Stress Psychology and Neurobiology. Psychosomatic Medicine 1999;61(1):112 (abstract).
Kamarck, et al. The Diary of Ambulatory Behavioral States: A new Approach to the Assessment of Psychosocial Influences on Ambulatory Cardiovascular Activity. Technology and Methods in Behavioral Medicine (D.S. Krantz and A. Baum, eds.) Lawrence Erlbaum Associates:Mahwah, New Jersey. 1998; Chapter 9:163-193.
Kamarck, et al. The effects of psychosocial influences on ambulatory blood pressure: contrasting different measurement and data analytic strategies. 37th Annual Meeting of the Society for Psychophysical Research, N. Falmouth, Massachusetts, USA, Oct. 15-19, 1997; Psychophysiology 1997;34 (Suppl. 1):S6-S7.
Kiuchi et al. A World Wide Web-based User Interface for a Data Management System for Use in Multi-institutional clinical trials—Development and Experimental Operation of an Automated Patient Registration and Random Allocation System. Controlled Clinical Trials. New York: Elseviar Sciences, Inc.;1996:(17)476-493.
Koop, et al. The use of handheld computers in clinical trials. Controlled Clinical Trials. 2002; 23:469-480.
Lorence, et al. Incremental adoption of information security in health-care organizations: implications for document management. IEEE Trans Inf Technol Biomed. Jun. 2005;9(2):169-73.
Lussier et al. PureMD: a Computerize Patient Record Software for Direct Data Entry by Physicians: Using a Keyboardless Pen-Based Portable Computer. American Medical Informatics Association, McGraw Hill. 1992;261-264.
McKenzie, et al. Proving the ediary dividend. Appl Clin Trials. Jun. 1, 2004.
Missinou, et al. Short report: Piloting paperless data entry for clinical research in Africa. Am. J. Top. Med. Hyg. 2005; 72(3):301-303.
Mitchel, et al. The impact of electronic data capture on clinical data management: perspectives from the present into the future. Technology in Clinical Research. Aug. 2008; 37-41.
Notice of allowance dated Apr. 13, 2015 for U.S. Appl. No. 12/965,719.
Notice of allowance dated May 19, 2011 for U.S. Appl. No. 09/825,533.
Notice of allowance dated Jun. 3, 2008 for U.S. Appl. No. 11/324,504.
Notice of Allowance dated Jun. 14, 2013 for U.S. Appl. No. 13/603,035.
Notice of allowance dated Sep. 14, 2010 for U.S. Appl. No. 11/844,632.
Notice of allowance dated Sep. 24, 2004 for U.S. Appl. No. 09/825,534.
Notice of allowance dated Oct. 24, 2012 for U.S. Appl. No. 12/509,318.
Notice of allowance dated Dec. 30, 2011 for U.S. Appl. No. 13/211,133.

(56) References Cited

OTHER PUBLICATIONS

O'Connell, et al. Coping in real time: using Ecological Momentary Assessment techniques to assess coping with the urge to smoke. Res. Nurs. Health. Dec. 21, 1998;(6):487497.
O'Connell, et al. Overcoming the Urge to Smoke: The Strategies of Long-Term Abstainers and Later Relapsers. Psychology of Addictive Behavior 1991;5(1):1-8.
O'Connell, et al. Reversal theory and smoking: a state-based approach to ex-smokers' highly tempting situations. J. Consult. Clin. Psychol. Aug. 1990;58(4):489-494.
O'Connell, et al. Symptom beliefs and actual blood glucose in type II diabetes. Res. Nurs. Health. Jun. 13, 1990;(3): 145-151.
O'Connell, K Why rational people do irrational things. The theory of psychological reversals. J. Psychosoc. Nurs. Ment. Health Serv. Jan. 29, 1991;(1):11-14.
Office action dated Feb. 9, 2006 for U.S. Appl. No. 09/825,533.
Office action dated Feb. 19, 2010 for U.S. Appl. No. 11/844,632.
Office action dated Mar. 9, 2012 for U.S. Appl. No. 12/509,318.
Office action dated Mar. 13, 2012 for U.S. Appl. No. 12/965,719.
Office action dated Apr. 3, 2009 for U.S. Appl. No. 09/825,533.
Office action dated Apr. 29, 2010 for U.S. Appl. No. 09/825,533.
Office action dated May 8, 2014 for U.S. Appl. No. 12/965,719.
Office action dated May 20, 2008 for U.S. Appl. No. 09/825,533.
Office action dated May 26, 2015 for U.S. Appl. No. 13/801,853.
Office action dated Jun. 26, 2014 for U.S. Appl. No. 13/801,853.
Office action dated Sep. 8, 2006 for U.S. Appl. No. 09/825,533.
Office action dated Sep. 18, 2013 for U.S. Appl. No. 13/801,853.
Office action dated Oct. 11, 2012 for U.S. Appl. No. 12/965,719.
Office action dated Oct. 14, 2011 for U.S. Appl. No. 12/965,719.
Office action dated Nov. 14, 2007 for U.S. Appl. No. 11/324,504.
Office action dated Nov. 17, 2014 for U.S. Appl. No. 13/953,503.
Office action dated Nov. 22, 2013 for U.S. Appl. No. 13/801,853.
Office action dated Nov. 25, 2011 for U.S. Appl. No. 12/509,318.
Office action dated Nov. 26, 2010 for U.S. Appl. No. 09/825,533.
Palermo, et al. A randomized trial of electronic versus paper pain diaries in children: impact on complianc, accuracy, and acceptability. Pain. Feb. 2004; 107:213-219.
Palmblad, et al. Electronic diaries and questionnaires: designing user interfaces that are easy for all patients to use. Qual Life Res. Sep. 2004;13(7):1199-207.
Park, et al. 3B-1 Noninvasive Insulin Delivery in Large Pigs (> 100 Ibs) Using the Lightweight Cymbal Array. Ultrasonics Symposium, 2007. IEEE Oct. 28-31, 2007 pp. 104-107 Digital Object Identifier 10.1109/ULTSYM.2007.39.
Paty, et al. The importance of assessing base rates for clinical studies: an example of stimulus control of smoking. The Experience of Psychopathology: Investigating Mental Disorders in their Natural Settings (DeVries, Marten W. ed.) Cambridge University Press:Cambridge, England. 1992; pp. 347-352.
Penner, et al. Individual Differences in Intraperson Variability in Mood. Journal of Personality and Social Psychology 1994;66(4):712-721.
Potocky, et al. State-outcome consistency in smoking relapse crises: a reversal theory approach. J. Consult. Clin. Psychol. Apr. 1991;59(2):351-353.
Powell, J. Handhelds aid doctors. Retrieved from the Internet, www.bostonherald.com/business/technology/ palm07032000.htm Jul. 3, 2000.
Prokscha. Electronic data capture systems. Practical Guide to Clinical Data Management, Second Edition. 2006; Ch 17:153-161.
Raymond, et al. Electronic Subject Diaries in Clinical Trials. Applied Clinical Trials. Mar. 2000; 8 pages.
Raynor, et al. The effects of social influence on cardiovascular responsiveness in the natural environment. 37th Annual Meeting of the Society for Psychophysical Research, N. Falmouth, Massachusetts, USA, Oct. 15-19, 1997,. Psychophysiology 1997;34 (Suppl. 1):573.
Rekimoto, J. Time-machine computing: a time-centric approach for the information environment. UIST '99 Proceedings of the 12th annual ACM symposium on User interface software and technology. ACM New York, NY, USA © 1999; 45-54. CHI Letters vol. 1, 1.
Ross, et al. Relation of implicit theories to the construction of personal histories. Psychological review. 1989, vol. 96, No. 2, pp. 341-357.
Salford Systems. Cart® for Windows User's Guide. A Salford Systems Implementation of the Original CART Program. 1999;i-v, 1-90, Index.
Schwartz, et al. Does trait coping exist? A momentary assessment approach to the evaluation of traits. J. Pers. Soc. Psychol. Aug. 1999;77(2):360-369.
Schwartz, et al. Strategies for analyzing ecological momentary assessment data. Health Psychol. Jan. 1998;17(1):6-16.
Shalev, et al. Towards an expert system for treatment planning. Engineering in Medicine and Biology Society, 1988. Proceedings of the Annual International Conference of the IEEE Nov. 4-7, 1988 pp. 1444-1445, vol. 3 Digital Object Identifier 10.1109/IEMBS.1988. 95302.
Shiffman, et al. A day at a time: predicting smoking lapse from daily urge. J. Abnorm. Psychol. Feb. 1997;106(1):104-116.
Shiffman, et al. Comparative efficacy of 24-hour and 16-hour transdermal nicotine patches for relief of morning craving. Addiction Aug. 2000;95(8): 1185-1195.
Shiffman, et al. Drinking and Smoking. A Field Study of their Association. Annals of Behavioral Medicine 1994;16(3):203-209.
Shiffman, et al. Dynamic effects of self-efficacy on smoking lapse and relapse Health Psychol. Jul. 2000;19(4):315-323.
Shiffman, et al. First lapses to smoking: within-subjects analysis of real-time reports. J. Consult. Clin. Psychol. Apr. 1996;64(2):366-379.
Shiffman, et al. Individual differences in the context of smoking lapse episodes. Addict. Behav. Nov.-Dec. 1997;22(6):797-811.
Shiffman, et al. Introduction to the special section: Ecological momentary assessment in health psychology. Health Psychology. Jan. 1988; 17(1):3-5.
Shiffman, et al. Methods of measuring patient experience: Paper versus electronic patient diaries. Invivodata, Inc. Jan. 30, 2001 (9 pages).
Shiffman, et al. Nicotine withdrawal in chippers and regular smokers: subjective and cognitive effects. Health Psychol. Jul. 1995;14(4):301-309.
Shiffman, et al. Patient experience: A growing focus in clinical trials. Invivodata, Inc. Jan. 30, 2001 (8 pages).
Shiffman, et al. Progression from a smoking lapse to relapse: prediction from abstinence violation effects, nicotine dependence, and lapse characteristics. J. Consult. Clin. Psychol. Oct. 1996;64(5):993-1002.
Shiffman, et al. Remember that? A comparison of real-time versus retrospective recall of smoking lapses. J. Consult. Clin. Psychol. Apr. 1997;65(2):292-300.
Shiffman, et al. Subject experience diaries in clinical research, Part 1: The patient experience movement; Part 2: Ecological momentary assessment. Applied Clinical Trials. Feb. & Mar. 2001 (12 pages).
Shiffman, et al. Temptations to smoke after quitting: a comparison of lapsers and maintainers. Health Psychol. Nov. 1996;15(6):455-461.
Shiffman, et al. The Abstinence Violation Effect Following Smoking Lapses and Temptations. Cognitive Therapy and Research 1997;21(5):497-523.
Shiffman, et al. The effect of bupropion on nicotine craving and withdrawal. Psychopharmacology Jan. 2000;148(1):33-40.
Shiffman, et al. The scientific principles underlying patient experience research: Ecological momentary assessment. Invivodata, Inc. Jan. 30, 2001 (8 pages).
Shiffman, S. Assessing Smoking Patterns and Motives. Journal of Consulting and Clinical Psychology 1993;61(5):732-742.
Shiffman, S. Real-Time Self-Report of Momentary States in the Natural Environment: Computerized Ecological Momentary Assessment. The Science of Self-Report: Implicates for Research and Practice (A. Stone, et al. eds.) Lawrence Erlbaum Associates:Mahwah, New Jersey. 1989; Chapter 16: 277-296.
Shingo, et al. Correlation of airway obstruction and patient-reported endpoints in clinical studies. Eur Respir J. Feb. 2001;17(2):220-4.

(56) References Cited

OTHER PUBLICATIONS

Smith, G. Statistical Reasoning 3rd edition. Needham Heights: Allyn and Bacon; 1991:619-67.
Stokes, et al. Developing and implementing electronic patient diaries: the clinical protocal. Applied Clinical Trials. Mar. 2003; 12(3):46-56.
Stokes, et al. Developing and Validating Electronic Diaries. Applied Clinical Trials. Jun. 2003; 68-78.
Stolworthy, et al. PDAs in clinical data management. SoCRA Source. Aug. 2003; 24-26.
Stone, et al. A comparison of coping assessed by ecological momentary assessment and retrospective recall. J. Pers. Soc. Psychol. Jun. 1998;74(6):1670-1680.
Stone, et al. Does the peak-end phenomenon observed in laboratory pain studies apply to real-world pain in rheumatoid arthritics? The Journal of Pain. Fall 2000;1(3):212-217.
Stone, et al. Ecological Momentary Assessment (EMA) in Behavioral Medicine. Annals of Behavioral Medicine 1994; 16(3): 199-202.
Stone, et al. Ecological Momentary Assessment. Well-being: The foundations of Hedonic psychology. Kahneman, Daniel et al. (eds.). Russell Sage Foundation: New York, NY. 1999;pp. 26-39.
Stone, et al. Patient non-compliance with paper diaries. BMJ. 2002; 324:1193-1194.
Straka, et al. Patient and self-reporting of compliance does not correspond with electronic monitoring: an evaluation using isosorbide dinitrate as a model drug. Pharmacotherapy. Jan.-Feb. 1997.;17(1):126-132.
Tattersall et al. The Use of a Hand-held Computer to Record Clinical Trial Data in General Practice: a Pilot Study. The Journal of International Medical Research. 1989;17:185-89.
Taylor et al. The use of a real-time computer diary for data acquisition and processing. Behav. Res. Ther.1990;(28)1:93-97.
The Gantry Group, LLC. ROI Value Driver Study for PalmTM Mobile Solutions: Clinical Trials. May 2003; 17 pages.
Tomkies, K. Taking a New Tack on Clinical Trial Data Collection: New Internet-based software aims to improve data integrity, helping speed data transmission in the process. Retrieved from the Internet www.office.com/global/0,,53-17789,FF.html. May 18, 2000.
Totterdell et al. In situ repeated measures of affect and cognitive performance facilitated by use of a hand-held computer. Behavior Research Methods, Instruments and Computers. 1992;24(4):545-53.
Tourangeau. Survey research and societal change. Annu Rev Psychol. 2004; 55:775-801.
U.S. Appl. No. 13/211,133, filed Aug. 16, 2011.
U.S. Appl. No. 13/399,150, filed Feb. 17, 2012.
U.S. Appl. No. 13/603,035, filed Sep. 4, 2012.
U.S. Appl. No. 13/801,853, filed Mar. 13, 2013.
U.S. Appl. No. 13/953,503, filed Jul. 29, 2013.
U.S. Appl. No. 14/579,574, filed Dec. 22, 2014.
U.S. Appl. No. 14/579,670, filed Dec. 22, 2014.
U.S. Department of Health and Human Services Food and Drug Administration, et al. Guidance for Industry Patient-Reported Outcome Measures: Use in Medical Product Development to Support Labeling Claims. Feb. 2006 Clinical/Medical.
U.S. Department of Health and Human Services Food and Drug Administration, et al. Guidance for Industry Patient-Reported Outcome Measures: Use in Medical Product Development to Support Labeling Claims. Feb. 2009 Clinical/Medical.
Weisspeiner, et al. Multichannel Ambulatory Monitoring of Circulation Related Biosignals. Proceedings. Computers in Cardiology, Sep. 23-26, 1991; Venice, Italy. IEEE Comput. Soc. Press: Los Alamitos, CA, USA. 1991;p. 457-460.
Zimmet et al. Computer-Based Patient Monitoring Systems: Use in Research and Clinical Practice. Diabetes Care. Nov./Dec. 1988; (11) Supp. 1:62-6.
Zwiebel. EDC: A Brief Guide to Study Start-up. Published Aug. 2, 2002. http://www.appliedclinicaltrialsonline.com/appliedclinicaltrials/Feature+Article/EDC-A-Brief-Guide-to-Study-Start-up/ArticleStandard/Article/detail/83566. Accessed Sep. 10, 2012.
https://web.archive.org/web/20001201220000/http://www.crfbox.com. Accessed Sep. 28, 2015.
https://web.archive.org/web/20010201072400/http://crfbox.com. Accessed Sep. 28, 2015.
https://web.archive.org/web/20010226175201/http://crfbox.com. Accessed Sep. 28, 2015.
https://web.archive.org/web/20010402003750/http://crfbox.com. Accessed Sep. 28, 2015.
https://web.archive.org/web/20010710204214/http://www.crfbox.com/2.2.html. Accessed Oct. 5, 2015.
https://web.archive.org/web/20010710204327/http://www.crfbox.com/2.3.html. Accessed on Oct. 5, 2015.
https://web.archive.org/web/20010713065230/http://www.crfbox.com/3.2.html. Accessed Sep. 28, 2015.
https://web.archive.org/web/20010718111538/http://www.crfbox.com/3.1.html. Accessed Sep. 28, 2015.
https://web.archive.org/web/20010719174752/http://www.crfbox.com/3.html. Accessed Oct. 5, 2015.
https://web.archive.org/web/20010721054420/http://www.crfbox.com/5.2.html. Accessed Oct. 5, 2015.
https://web.archive.org/web/20010725181157/http://www.crfbox.com/news/news5.html. Accessed Sep. 28, 2015.
https://web.archive.org/web/20010726213424/http://www.crfbox.com/news/news6.html. Accessed Oct. 5, 2015.
https://web.archive.org/web/20010812073633/http://www.crfbox.com/4.1.html. Accessed Oct. 5, 2015.
https://web.archive.org/web/20010812074841/http://www.crfbox.com/4.2.html . Accessed Oct. 5, 2015.
https://web.archive.org/web/20010905193509/http://www.crfbox.com/news/news4.html. Accessed Sep. 28, 2015.
https://web.archive.org/web/20011124003540/http://www.crfbox.com/news/news3.html. Accessed Sep. 28, 2015.
https://web.archive.org/web/20011222025011/http://www.crfbox.com/news/news2.html. Accessed Sep. 28, 2015.
https://web.archive.org/web/20020616090851/http://www.crfbox.com/news/news1.html. Accessed Sep. 28, 2015.
Letter dated Aug. 1, 2014 from Andrew P. Nemiroff of Cozen to Louis Lieto of Wilson Sonsini Goodrich & Rosati regarding U.S. Pat. Nos. 8,065,180; 8,145,519 and 8,433,605.
Letter dated May 14, 2014 from Andrew P. Nemiroff of Cozen to Louis Lieto of Wilson Sonsini Goodrich & Rosati regarding U.S. Pat. Nos. 8,065,180; 8,145,519 and 8,433,605.
Letter dated Oct. 1, 2015 from Andrew P. Nemiroff of Law Office of Andrew P. Nemiroff, Esq. to Edward G. Poplawski of Wilson Sonsini Goodrich & Rosati regarding *eResearch Technology, Inc.* v. *CRF, Inc.* (15-918).
Office action dated Oct. 9, 2015 for U.S. Appl. No. 13/801,853.
Co-pending U.S. Appl. No. 11/002,046, filed Jan. 12, 2014.
Frey, et al. A formal specification and verification framework for time-warp based parallel simulation. IEEE transactions on software engineering. 2002; 28(1):58-78.
Notice of allowance dated Dec. 19, 2012 for U.S. Appl. No. 13/399,150.
Office action dated Jan. 8, 2008 for U.S. Appl. No. 11/002,046.
Office action dated Jan. 26, 2007 for U.S. Appl. No. 09/840,730.
Office action dated Jan. 29, 2009 for U.S. Appl. No. 09/840,730.
Office action dated Feb. 20, 2015 for U.S. Appl. No. 13/688,962.
Office action dated Mar. 12, 2013 for U.S. Appl. No. 13/603,035.
Office action dated Mar. 20, 2015 for U.S. Appl. No. 13/670,151.
Office action dated Apr. 19, 2006 for U.S. Appl. No. 11/002,046.
Office action dated Jun. 16, 2008 for U.S. Appl. No. 09/840,730.
Office action dated Jun. 18, 2007 for U.S. Appl. No. 11/002,046.
Office action dated Jul. 2, 2014 for U.S. Appl. No. 13/670,151.
Office action dated Jul. 12, 2005 for U.S. Appl. No. 11/002,046.
Office action dated Sep. 3, 2015 for U.S. Appl. No. 13/688,962.
Office action dated Oct. 4, 2005 for U.S. Appl. No. 09/840,730.
Office action dated Oct. 22, 2014 for U.S. Appl. No. 13/801,853.
Office action dated Dec. 5, 2006 for U.S. Appl. No. 11/002,046.
Office action dated Dec. 20, 2007 for U.S. Appl. No. 09/840,730.

(56) References Cited

OTHER PUBLICATIONS

Patrick, et al. Patient-reported outcomes to support medical product labeling claims: FDA perspective. Value in Health. 2007; 10, S125-S137.
Rokosz, Vaughn T. Long-term testing in a short-term world. Software, IEEE. 2003; 20(3):64-67.
Straka, et al. Patient self-reporting of compliance does not correspond with electronic monitoring: an evaluation using isosorbide dinitrate as a model drug. Pharmacotherapy. Jan.-Feb. 1997;17(1):126-32.
Co-pending U.S. Appl. No. 14/670,261, filed Mar. 26, 2015.
Office action dated Apr. 21, 2016 for U.S. Appl. No. 13/670,151.
Memorandum opinion dated May 16, 2017 for *Eresearchtechnology, Inc.* v. *CRF, Inc.* Civil Action No. 15-918, Hor. Hora Barry Fischer in the United States District Court for the Western District of Pennsylvania.
Office action dated Jan. 3, 1996 for U.S. Appl. No. 08/394,157.
Office action dated Jan. 4, 2012 for U.S. Appl. No. 12/177,540.
Office action dated Feb. 7, 2006 for U.S. Appl. No. 10/693,232.
Office action dated Feb. 10, 1997 for U.S. Appl. No. 08/394,157.
Office action dated Apr. 11, 2007 for U.S. Appl. No. 10/693,232.
Office action dated May 2, 2000 for U.S. Appl. No. 09/447,986.
Office action dated May 18, 1999 for U.S. Appl. No. 09/001,032.
Office action dated May 20, 2016 for U.S. Appl. No. 13/801,853.
Office action dated Jun. 7, 2011 for U.S. Appl. No. 12/177,540.
Office action dated Jun. 8, 2000 for U.S. Appl. No. 09/447,986.
Office action dated Jul. 10, 1997 for U.S. Appl. No. 08/394,157.
Office action dated Jul. 15, 2002 for U.S. Appl. No. 09/940,129.
Office action dated Jul. 17, 2007 for U.S. Appl. No. 09/840,730.
Office action dated Jul. 19, 2006 for U.S. Appl. No. 10/693,232.
Office action dated Sep. 29, 1998 for U.S. Appl. No. 09/001,032.
Office action dated Dec. 19, 2002 for U.S. Appl. No. 09/940,129.
Office action dated Dec. 30, 2010 for U.S. Appl. No. 12/177,540.
U.S. Department of Health and Human Services FDA Center for Drug Evaluation and Research, et al. Guidance for industry: patient-reported outcome measures: use in medical product development to support labeling claims: draft guidance. Health Qual Life Outcomes. Oct. 11, 2006;4:79. 20 pages.
Wikipedia. Marketing research. Available at http://en.wikipedia.org/wiki/Marketing_research. Accessed Nov. 30, 2012.
Office Action dated Feb. 8, 2017 for U.S. Appl. No. 14/670,261.
Office Action dated Oct. 13, 2016 for U.S. Appl. No. 14/579,670.
Appeal from the United States District Court for the Western District of Pennsylvania in Case No. 2:15-cv-00918-NBF, Judge Nora Barry Fischer. Filed Sep. 7, 2016. Appeal No. 16-2281. 174 pages.
Office action dated Aug. 31, 2016 for U.S. Appl. No. 13/670,151.
Office Action dated Nov. 16, 2016 for U.S. Appl. No. 13/688,962.
eResearchTechnology GmbH. MasterScope ©: Diagnostic Platform for Centralized Spirometry, ECG and Home Monitoring. © 2014 eResearchTechnology GmbH. Rev. 02, May 30, 2014. 4 pages.
eResearchTechnology GmbH. SpiroPro © CT: Handheld Spirometer and Pulse Oximeter. © 2014 eResearchTechnology GmbH. Rev. 01, Jul. 2014. 2 pages.
ERT ©. ERT Introduces Updated Diagnostic Platform for Centralized Spirometry, ECG, and Home Monitoring in Respiratory Clinical Trials. Web article. Jun. 16, 2014. 4 pages. URL:<https://www.ert.com/ert-introduces-updated-diagnostic-platform-for-centralized-spirometry-ecg-and-home-monitoring-in-respiratory-clinical-trials/>.
Office Action dated May 5, 2017 for U.S. Appl. No. 14/579,670.
Office Action dated May 22, 2017 for U.S. Appl. No. 13/670,151.
Office Action dated Jun. 8, 2017 for U.S. Appl. No. 13/688,962.
Office action dated Jun. 28, 2017 for U.S. Appl. No. 13/801,853.
Office Action dated Jan. 5, 2016 for U.S. Appl. No. 12/434,244.
Office Action dated Jan. 22, 2015 for U.S. Appl. No. 13/838,698.
Office Action dated Jan. 26, 2017 for U.S. Appl. No. 12/434,244.
Office Action dated Jan. 31, 2011 for U.S. Appl. No. 12/434,244.
Office Action dated Feb. 8, 2016 for U.S. Appl. No. 13/838,698.
Office Action dated Mar. 24, 2014 for U.S. Appl. No. 12/434,244.
Office Action dated Jun. 15, 2011 for U.S. Appl. No. 12/434,244.
Office Action dated Jun. 24, 2015 for U.S. Appl. No. 13/838,698.
Office Action dated Jul. 21, 2015 for U.S. Appl. No. 12/434,244.
Office Action dated Jul. 28, 2016 for U.S. Appl. No. 12/434,244.
Office Action dated Dec. 1, 2014 for U.S. Appl. No. 12/434,244.
Appeal from the United States District Court for the Western District of Pennsylvania in Case No. 2:15-cv-00918-NBF, Judge Nora Barry Fischer. Appeal No. 16-2281. Judgment. Entered Mar. 17, 2017. 2 pages.
Co-pending U.S. Appl. No. 15/291,103, filed Oct. 12, 2016.
Co-pending U.S. Appl. No. 15/468,613, filed Mar. 24, 2017.
Office Action dated Sep. 5, 2017 for U.S. Appl. No. 14/579,574.
Office Action dated Sep. 8, 2017 for U.S. Appl. No. 14/670,261.

\* cited by examiner

OPERATION AND METHOD FOR PREDICTION AND MANAGEMENT OF THE VALIDITY OF SUBJECT REPORTED DATA

CROSS-REFERENCE

This application is a continuation of U.S. patent application Ser. No. 12/965,719, filed Dec. 10, 2010, which issued as U.S. Pat. No. 9,129,215 on Sep. 8, 2015, which is a continuation of U.S. patent application Ser. No. 11/844,632, filed Aug. 24, 2007, which issued as U.S. Pat. No. 7,873,589 on Jan. 18, 2011, which is a continuation-in-part application of U.S. patent application Ser. No. 11/002,046, filed Dec. 1, 2004, now abandoned, which is a continuation application of U.S. patent application Ser. No. 09/825,534, filed Apr. 2, 2001, which issued as U.S. Pat. No. 6,879,970 on Apr. 12, 2005, which applications are incorporated herein by reference in their entirety.

BACKGROUND OF THE INVENTION

Evaluation of subject compliance or the validity of subject reported data within research protocols typically looks at only one variable at a time. Such evaluation is not empirically derived by quantitative analysis of existing datasets, instead relying on the researcher's judgment and biases to determine whether and what type of corrective action is required. Furthermore, evaluation of subject compliance or the validity of reported data within research protocols has typically not taken into account the domain of the protocol or the characteristics of the subjects. Previously, such evaluation often was not made in a timely way, but was made only after serious noncompliance had occurred or invalidity of reported data was demonstrated.

SUMMARY OF THE INVENTION

The goal of research protocols is to collect valid, consistent and/or reproducible data on one or more conditions from groups of subjects involved in protocols such as clinical trials or surveys. The reliability and consistency of the data may be affected by factors such as the compliance of the subjects in a clinical trial or the validity of subject reported data in a survey.

Subjects in clinical trials are assigned tasks related to treatment and data collection in accordance with a research protocol. The integrity of clinical trials rests upon subjects' faithful performance of these tasks. If subjects fail to comply with the protocol, the trial fails to yield reliable, valid results. Thus, subject noncompliance in clinical trials is a significant risk and cost to the pharmaceutical industry. Accordingly, predicting subject performance and assessment of such performance is of substantial value to clinical research.

Subjects participating in surveys such as market research, opinion surveys, opinion polling, political polling, or workplace satisfaction surveys are questioned in a manner designed to provide answers relevant to the goals or objectives of the research study. If subjects fail to answer the questions truthfully or carefully, the survey fails to yield reliable, valid results. Thus, the potential invalidity of subject reported data in surveys is a significant risk and cost to any industry concerned with the results of opinion polls. Accordingly, assessing subject performance and prediction of such performance is of substantial value to survey research.

The benefits of a system that can predict and track subject compliance in a clinical trial or the validity of subject reported data in a survey include factors such as increased consistency, reproducibility or statistical power, reduced clinical trial or survey costs through smaller sample sizes, validity, or reduced time to complete the clinical trial or survey.

According to one aspect of the invention, a method of predicting subject noncompliance is provided. The method comprises the steps of analyzing historical subject compliance data, generating at least one predictive algorithm for predicting subject noncompliance by quantitative analysis of the historical subject compliance data, and translating the at least one predictive algorithm into at least one prediction rule for use with a clinical trial.

According to another aspect, a method of determining subject noncompliance comprises the steps of analyzing at least one data set selected from the group consisting of: historical subject compliance data and historical protocol data and generating at least one algorithm reflective of at least one of historical subject compliance data and historical protocol data by quantitatively analyzing the historical subject compliance data and the historical protocol data. The method may also comprise translating the algorithm into at least one decision rule for analyzing subject compliance information, obtaining the subject compliance information and comparing the subject compliance information to the at least one decision rule to determine if corrective action is needed.

According to a further aspect, a method of the invention comprises the steps of analyzing historical subject compliance data and historical protocol data, generating a range of noncompliance representative of the historical subject compliance data not compliant with the historical protocol data by quantitative analysis of the historical subject compliance data and the historical protocol data, obtaining current subject compliance information and comparing the range of noncompliance to the current subject compliance information to determine if corrective action is needed.

According to another aspect of the invention, a method of predicting the validity of subject reported data is provided. The method comprises the steps of analyzing historical validity markers, generating at least one predictive algorithm for predicting the invalidity of subject reported data by quantitative analysis of the historical validity of subject reported data, and translating the at least one predictive algorithm into at least one prediction rule for use with a survey.

According to another aspect of the invention, a method of predicting the validity of subject reported data is provided. The method comprises the steps of analyzing validity markers from at lease one event, generating at least one predictive algorithm for predicting the invalidity of subject reported data by quantitative analysis of the validity of subject reported data, and translating the at least one predictive algorithm into at least one prediction rule for use with a survey.

According to another aspect of the invention, a method of determining the validity of subject reported data comprises the steps of analyzing at least one data set selected from the group consisting of: information on the historical validity of subject reported data and historical protocol data. In another step, at least one algorithm reflective of said at least one data set is generated, by quantitatively analyzing the information in said at least one data set. In one embodiment the method may also comprise, translating the algorithm into at least one decision rule for analyzing the validity of subject reported data, obtaining validity markers, for at least one event, and analyzing the validity of the subject reported data with the at least one decision rule to determine if corrective action is needed.

According to another aspect of the invention, a method of determining the validity of subject reported data comprises: analyzing at least one data set selected from the group consisting of: validity markers from at least one event, and protocol data; generating at least one algorithm reflective of said at least one data set, by quantitatively analyzing the validity of subject reported data and the protocol data. In one embodiment the method may also comprise, translating the algorithm into at least one decision rule for analyzing the validity of subject reported data, obtaining the validity markers from at least one event and analyzing the validity of the subject reported data with the at least one decision rule to determine if corrective action is needed. In one embodiment the protocol data is historical protocol data from more than one clinical trial or survey. In another embodiment the protocol data is from a single clinical trial or survey.

According to another aspect of the invention, a method of determining the validity of subject reported data comprises: analyzing historical validity markers and historical protocol data, generating a range of validity representative of the historical validity markers not compliant with the historical protocol data by quantitative analysis of historical validity markers and the historical protocol data, obtaining current validity markers from a at least one event and comparing the range of validity to the current validity markers to determine if corrective action is needed.

In yet another aspect of the invention, a method of detecting subject fraud is provided, comprising analyzing subject compliance data or validity markers, and protocol data, generating at least one fraud detection algorithm for detecting subject fraud by quantitative analysis of the historical subject compliance data or validity markers, and the historical protocol data and translating the at least one fraud detection algorithm into at least one fraud detection rule for use with a clinical trial or survey. In one embodiment the protocol data is historical protocol data from more than one clinical trial or survey. In another embodiment the protocol data is from a single clinical trial or survey.

In another aspect of the invention, a method of detecting subject fraud is provided, comprising analyzing subject compliance data or validity markers, generating at least one fraud detection algorithm for detecting subject fraud by quantitative analysis of the compliance data or validity markers and translating the at least one fraud detection algorithm into at least one fraud detection rule for use with a clinical trial or survey. In one embodiment the compliance data or validity markers are acquired from at least one subject for at least one event. In another embodiment the compliance data or validity markers are historical data or information is acquired from at least one subject for more than one event.

In one aspect of the invention, a medium suitable for use in an electronic device is provided, comprising instructions for execution on the electronic device. The instructions, comprising the steps of providing at least one of the group consisting of compliance data, validity markers and protocol data, generating at least one predictive algorithm for predicting subject noncompliance or invalidity by quantitative analysis of at said data set and translating said at least one predictive algorithm into at least one prediction rule for use with a clinical trial or survey. In one embodiment the compliance data or validity markers are acquired from at least one subject for at least one event. In another embodiment the compliance data or validity markers are historical data or information is acquired from at least one subject for more than one event. In one embodiment the protocol data is historical protocol data from more than one clinical trial or survey. In another embodiment the protocol data is from a single clinical trial or survey.

In some other aspects of the invention, a medium suitable for use in an electronic device is provided, comprising instructions for execution on the electronic device, the instructions comprising analyzing at least one data set selected from the group consisting of subject compliance data, validity markers and protocol data, generating at least one algorithm reflective of said at least one data set by quantitative analysis of said at least one data set, translating the at least one algorithm into at least one decision rule for analyzing subject compliance information, obtaining the subject compliance information and comparing the subject compliance information to the at least one decision rule to determine if corrective action is needed. In one embodiment the compliance data or validity markers are acquired from at least one subject for at least one event. In another embodiment the compliance data or validity markers are historical data or information is acquired from at least one subject for more than one event. In one embodiment the protocol data is historical protocol data from more than one clinical trial or survey. In another embodiment the protocol data is from a single clinical trial or survey.

According to another aspect of the invention, a medium suitable for use in an electronic device is provided, comprising, instructions for execution on the electronic device. The instructions comprise analyzing subject compliance data or validity markers and protocol data; generating a spectrum of noncompliance or invalidity representative of the subject compliance data or validity markers, not consistent with the protocol data by quantitative analysis of the subject compliance data or validity markers, and the protocol data; obtaining subject compliance data or validity markers; and comparing the spectrum of noncompliance or invalidity to the subject compliance data or validity markers to determine if corrective action is needed. In one embodiment the compliance data or validity markers are acquired from at least one subject for at least one event. In another embodiment the compliance data or validity markers are historical data or information is acquired from at least one subject for more than one event. In one embodiment the protocol data is historical protocol data from more than one clinical trial or survey. In another embodiment the protocol data is from a single clinical trial or survey According to another aspect of the invention, a medium suitable for use in an electronic device is provided, having instructions for execution on the electronic device. The instructions comprise analyzing subject compliance data or validity markers, and protocol data, generating at least one fraud detection algorithm for detecting subject fraud by quantitative analysis of the subject compliance data or validity markers, and the protocol data and translating the at least one fraud detection algorithm into at least one fraud detection rule for use with a clinical trial or survey. In one embodiment the compliance data or validity markers are acquired from at least one subject for at least one event. In another embodiment the compliance data or validity markers are historical data or information is acquired from at least one subject for more than one event. In one embodiment the protocol data is historical protocol data from more than one clinical trial or survey. In another embodiment the protocol data is from a single clinical trial or survey

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
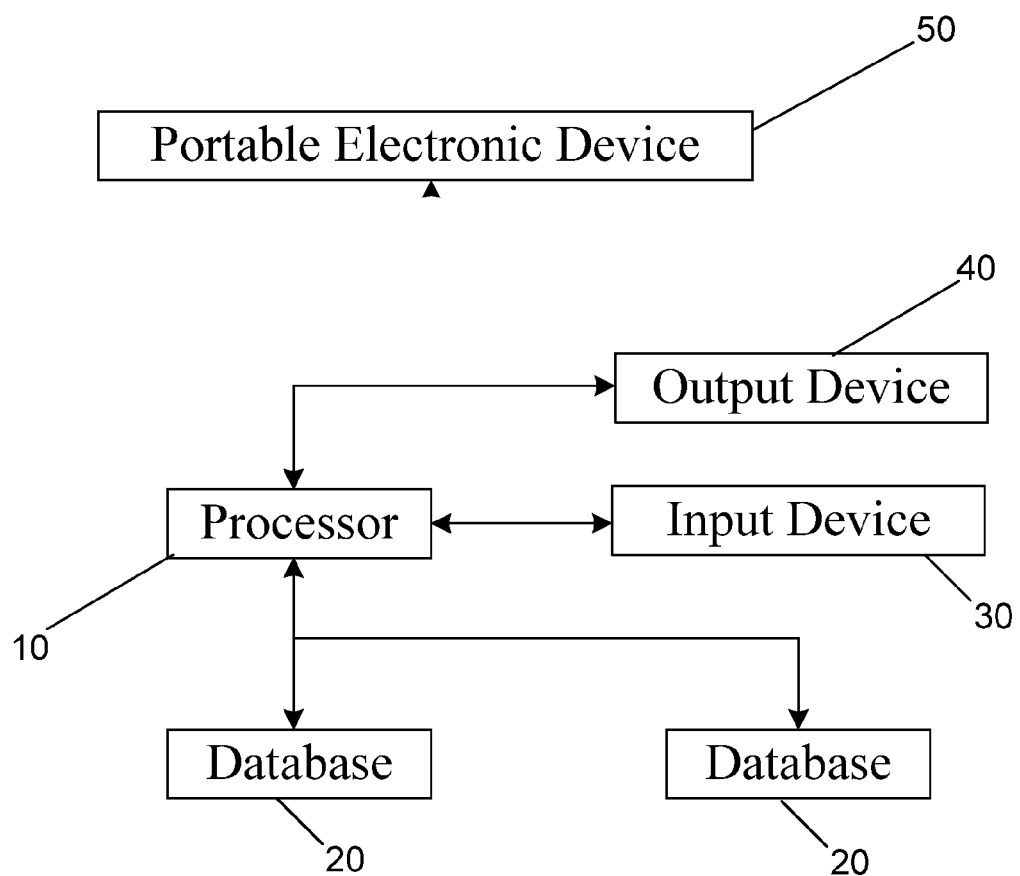
FIG. 1 illustrates a system for determining subject noncompliance or the invalidity of subject reported data according to one embodiment of the teachings of the present invention.

The present invention involves an empirically derived set of algorithms and decision rules that, in one aspect, can predict subject compliance, and detect noncompliance, within research protocols such as clinical trials. In an alternative aspect the empirically derived set of algorithms and decision rules can predict the validity of subject reported data, and detect invalidity, within research protocols, such as surveys. In some embodiments algorithms and decision rules are used to provide an empirical approach for predicting different types of subject noncompliance or invalidity, within research protocols. This actuarial approach to predicting subject noncompliance or invalidity, within clinical trial protocols or surveys, respectively, is consistent with empirical research demonstrating the superiority of actuarial prediction of human behavior as compared to subjective clinical judgment. In one embodiment the consistency of a subject's responses within a survey is measured. In another embodiment the reliability of a subject's responses is measured. In a further embodiment the reproducibility of a subject's responses is measured. In another embodiment, a portable electronic device is used to query and collect data from the subject. In another embodiment of the invention an interactive voice response (IVR) system is used to query and collect data from the subject.

Definitions

As used herein "clinical trial" refers to a broad range of data collecting activities, including studies directed to monitoring of one or more conditions within a clinical trial group of subjects. Examples of studies include, but are not limited to, drug trials involving humans, trials involving specific diet and/or exercise regimens, trials involving meditative practice, trials involving behavioral or educational interventions, trials involving acupuncture, trials involving medical devices, trials involving specific diet supplements and trials involving homeopathy.

As used herein "survey" refers to a broad range of data collecting activities, including studies directed to monitoring of one or more conditions within a group of participants in a survey. Examples of surveys include, but are not limited to market research surveys, opinion surveys, opinion polling, political polling, opinion surveys and workplace satisfaction surveys.

As used herein "event" means a single occurrence in a protocol. For example, in the context of opinion polling an event may consist of a single question completed by a subject. In some embodiments an event may consist of a single occurrence in a protocol comprising multiple occurrences, such as an opinion survey that repeatedly questions one or more subjects, or a clinical trial that repeatedly collects data from participants at different time points. An event may consist of a single assessment of a subject, such as a subject's response in a marketing market research survey.

As used herein "market research" refers to any process of systematic gathering, recording and analyzing of data about customers, competitors and the relevant market for a good or service. Market research surveys can gather empirical data about goods or services used and/or qualitative data such as attributes of a good or service that a customer desires. Example of such studies include, but are not limited to, research intended to determine: what customers desire in a test product or service; who are the customers for a particular good or service; where are they located and how can they be contacted; what quantity and quality do customers use of a particular good or service; what is the best time to sell; what is the long-term or historical price and/or preference of a good or service data over a historical time frame; is there more demand for one product or another; and, what is a customer's or potential customer's experience with a product and its use?

As used herein "opinion polling" refers to surveys of opinion using sampling. They are usually designed to represent the opinions of a population by asking a small number of people a series of questions and then extrapolating the answers to the larger group. Examples of such polls include: straw votes, exit polls, entrance polls, and various other kinds of political candidate, policy or issue polls.

As used herein an "opinion survey" refers to any survey designed to measure a subject's opinion about a particular issue or topic. Examples include a subject's opinion about the economy, overall job security, quality of life, greatest threat facing this country, or religion.

As used herein "workplace satisfaction measurements" refers to any survey designed to measure employee perceptions about their existing environment. Examples include: employees' perceptions about management, vertical channels of communication, horizontal channels of communication, customer service, workload, workspace, compensation, benefits, management expectations, the company's strategic plans and overall employee satisfaction.

As used herein "subject" refers to any participant in a research protocol, such as clinical trial or a survey.

As used herein "trial data" or "clinical trial data" refers to data gathered for the principal purpose of the clinical trial. For example, trial data would include pain levels experienced by subjects in a pain medication clinical trial or craving levels in an anti-smoking medication clinical trial.

As used herein "survey data" refers to data gathered for the principle purpose of the survey. For example, survey data could include employee morale levels experienced by subjects in a workplace satisfaction survey, political preferences of a subject in a political poll, or preference of a particular good or service in a survey.

As used herein "compliance data" or "compliance information" is data that relates to the subjects' conformity to the instructed or expected way data are collected, the circumstances under which the trial data was collected or other data pertaining to characteristics of the trial data or other relevant data. Some examples include timeliness, consistency with other collected data, proximity of the data to an expected data range and completeness of the data.

As used herein "validity markers" or "validity information" is data that relates to the circumstances under which subject reported data, such as survey data, is collected. "Validity markers" include variables or data pertaining to characteristics of the survey data or other relevant data that reflects its veracity or consistency. Some examples include, but are not limited to, subject timeliness in answering question or responding to prompts, consistency with other collected data, proximity of the data to an expected data range, completeness of the data, subject voice stress levels, and any historical information on the subject's veracity.

As used herein "evaluability database" refers to a structured collection of records or data, comprising relevant compliance or validity data that contains information related to a clinical trial or a survey, respectively, or that relates to judgments about a subject's suitability to be included in the database for a clinical trial or survey. An evaluability database may include validity information about at least one event from at least one subject.

As used herein "historical protocol data" includes data specifying the research protocol of earlier clinical trials or surveys. Examples of historical protocol data can include questions posed to subjects, frequency of prompting of a subject during various times of the day or week, time allowed for subjects to respond to questions, requirements of subject behavior, and conditions mandating removal of a subject from certain statistical analyses or removal as participant in the clinical trial or survey.

As used herein "portable electronic device" refers to any electronic device that can be adapted for use by a subject and/or clinical staff and/or survey staff for viewing and/or inputting information. In some embodiments, the portable electronic device will also have a visual, audible or tactile alarm to gain the attention of the subject. In some other embodiments a pager having a vibration alarm may be used as a portable electronic device. Further examples include pagers with audible alarms and/or text messaging capabilities, a laptop computer or a cell phone, such as a smart phone. In one embodiment a portable electronic device will be provided with a display and at least one data input feature, including but not limited to a touch-sensitive screen, a microphone and buttons to enable a subject to respond to questions posed on the display or to input unsolicited information. In one embodiment a portable electronic device will be provided with at least one data output feature including but not limited to a display, a speaker, a vibratory device or one or more lights. Examples of portable electronic devices include, but are not limited to devices made by Hewlett Packard, Compaq, Palm (Palm Pilot), Apple, Handspring, Tap Wave, Sharp, Toshiba, NTT DoCoMo, Dell, Mitac, Fujitsu, ViewSonic, Acer, Anex TEK, ETEN, O2, Asus and Dopod. In some of these embodiments the portable electronic device may also be adapted to communicate with at least one other computer via a wireless connection or via a wired connection, including the use of a modem and/or a network, such as a LAN or the Internet. In another embodiment a portable electronic device may be a smart-phone, including but not limited to a FOMA D901i, FOMA D901iS, FOMA F2051, FOMA F2102V, FOMA F700i, FOMA F880iES, FOMA F900i, FOMA F900iC, FOMA F900iS, FOMA F900iT, Lenovo P930, Nokia 3230, Nokia 3250, Nokia 3600, Nokia 3620 Nokia 3650, Nokia 3660, Nokia 5500, Nokia 6110 Navigator, Nokia 6120 Classic, Nokia 6260, Nokia 6290, Nokia 6600, Nokia 6620, Nokia 6630, Nokia 6638, Nokia 6670, Nokia 6680, Nokia 6681, Nokia 6682, Nokia 7610, Nokia 7650, Nokia E50, Nokia E60, Nokia E61, Nokia E70, Nokia N70, Nokia N71, Nokia N72, Nokia N73, Nokia N75, Nokia N76, Nokia N80, Nokia N90, Nokia N91, Nokia N92, Nokia N93, Nokia N95, Nokia N-Gage, Nokia N-Gage QD, Panasonic X700, Panasonic X800, Samsung SGH-D700, Samsung SGH-D710, Samsung SGH-D720, Samsung SGH-D730, Sendo X, Sendo X2, Siemens SX1, Nokia Series 90, Nokia 7700, Nokia 7710, Arima U300, BenQ P30, BenQ P31, FOMA M1000, Motorola A920, Motorola A925, Motorola A1000, Motorola A1010, Motorola M1000, Nokia 6708, Sony Ericsson P800, Sony Ericsson P900, Sony Ericsson P910, Sony Ericsson P910a, Sony Ericsson P910c, Sony Ericsson P910i, Sony Ericsson P990, Sony Ericsson P990a, Sony Ericsson P990c, Sony Ericsson P990i, Sony Ericsson W950i, Sony Ericsson M600i, Handspring Treo 180, Handspring Treo 270, Handspring Treo 300, Kyocera 6035, Kyocera 7135, PalmOne, Treo 600, Treo 650, Treo 680, Treo 700p, Samsung SGH-i500, Samsung SGH-i505, Samsung SPH-i300, Samsung SPH-i330, Samsung SPH-i500, Samsung SPH-i550, Group Sense PDA-Xplore G18, Group Sense PDA-Xplore G88, Group Sense PDA-Xplore M28, Group Sense PDA-Xplore M68, Group Sense PDA-Xplore M70, Group Sense PDA-Xplore M98, Asus P505, Asus P505 Dual CPU, Audiovox PPC4100, Audiovox SMT5050, Audiovox SMT5600, Audiovox PPC6600, Audiovox Thera, Axia A108, BenQ P50, Casio DT-5200, CECT P08, Cingular 2100, Cingular 2125, Cingular 8100, Compal AR-11, Dopod 515, Dopod 535, Dopod 565, Dopod 577w, Dopod 585, Dopod 595, Dopod 686, Dopod 696i, Dopod 828, Dopod 828+, Dopod 830, Dopod 838, Dopod 900, Dopod 5300, E-TEN e88, E-TEN e88 plus, E-TEN G200, E-TEN G500, E-TEN M300, E-TEN M500, E-TEN M600, E-TEN M600+, E-TEN P300, E-TEN P300B, Europhone SG 4000, Everex E500, Everex E900, Everex E960, Everex SP360, Gigabyte Einstein, Gigabyte gSmart, Gizmondo, Hitachi G1000, HP iPaq h6300, HP iPaq hw6500, HP iPaq hw6900, Sagem My S-7, Samsung m8000, Samsung SCH-i600, Samsung SCH-i640, Samsung SCH-i645, Samsung SCH-i700, Samsung SCH-i730, Samsung SGH-i300, Samsung SGH-i300x, Samsung SGH-i310, Samsung SGH-i600, Samsung SGH-i700, Samsung SGH-i750, Sharp W-ZERO3, Siemens SX45, Siemens SX56, Sierra Wireless Voq A10, Sierra Wireless Voq A11, Telefonica TSM400, Torq P100, Torq P100w, Torq P120, Toshiba 2032, i-mate JAM 2, i-mate New JAM, i-mate Smartphone2, i-mate SP2, i-mate SP3, i-mate SP5, Kinpo iDo 5600, Krome Intellekt iQ200, Krome Intellekt iQ700, Krome SPY, Kyocera KC8100, Lenovo ET980, MiTAC Mio 8380, MiTAC Mio 8390, MiTAC Mio A700, MiTAC Mio A701, moboDA 3360, Motorola MPx200, Motorola MPx220, Motorola Q, Motorola i930, Neonode N1, Neonode N1m, Neonode N2, Orange SPV, Palm Treo 700w, Panda e88, Panda e88 plus, Pidion BM-150, Pidion BM-200, POZ X501, HTC Alpine, o Qtek 2020i, o Dopod 699, o Orange SPV M2500, o O2

XDAIIi, o i-mate PDA2, HTC Amadeus, o Qtek 8100, o T-Mobile SDA Music, o O2 Xphone IIm, HTC Apache, o Audiovox PPC6700, HTC Artemis, HTC Athena, O2 XDA Atom, HTC Blizzard, HTC Breeze, HTC BlueAngel, Qtek 9090, Dopod 700, Siemens SX66, T-Mobile MDA III, e-plus PDA III, TATA Indicom EGO, Vodafone VPA III, Orange SPV M2000, O2 XDAIIs, i-mate PDA2k, HTC Canary, Qtek 6080, Orange SPV Classic, i-mate Smartphone, HTC Charmer, HTC Falcon, HTC Faraday, Orange SPV C600, HTC Feeler, Qtek 8020, Dopod 575, Vodafone VDA, O2 Xphone II, i-mate SP3i, HTC Harrier, Verizon VX6600, Audiovox PPC6601, Daxian CU928, i-mate PDA2k EVDO, HTC Himalaya, Qtek 2020, Dopod 696, T-Mobile MDA II, Telefonica TSM500, Krome Navigator F1, Vodafone VPA, Orange SPV M1000, O2 XDA II, i-mate Phone Edition, HTC Hurricane, T-Mobile SDA II, Orange SPV C550, i-mate SP4m, HTC Magician, Qtek S100, Dopod 818, T-Mobile MDA Compact, Orange SPV M500, O2 XDA II Mini, i-mate JAM, HTC Muse, HTC Refresh, HTC Robbie, HTC Prodigy, HTC Prophet, Orange SPV M600, HTC Sonata, Qtek 8200, T-Mobile SDA, HTC Star Trek, HTC Tanager, Orange SPV E100, HTC Tornado Noble, O2 XDA IQ, i-mate SP5, HTC Tornado Tempo, Qtek 8300, Dopod 586w, i-mate SP5m, HTC Trinity, HTC Typhoon, Orange SPV C500, HTC TyTN (Hermes), Orange SPV M3100, Vodafone PDA 9600, O2 XDA Trion, T-Mobile MDA Vario II, i-mate JASJAM, Qtek 9600, Dopod CHT9000, Vodafone 1605, SoftBank X01HT, Dopod 838Pro, Cingular 8525, HTC Universal, Qtek 9000, Vodafone VPA IV, i-mate JAS-JAR, Orange SPV M5000, HTC Vivida, HTC Voyager, Orange SPV E200, Qtek 9100, Cingular 8125, O2 XDA Mini S, T-Mobile MDA, Vodafone VPA Compact, i-mate K-JAM, Qtek 1010, Qtek 7070, Qtek 8010, Qtek 8080, Qtek 8310, Qtek 8500, Qtek 9600, Qtek 5110, Qtek 5200, Qtek 5300, Qtek 5310, Motorola A760—The first phone to use Linux., Motorola A780, Motorola E680, Motorola E680i, Motorola E895, E28 E2800, NEC N901iC, NEC N700i, NEC N900i1, NEC N901iS, Panasonic P700i, Panasonic P901i, Panasonic P901iS, TCL e787, iPhone, a Black Berry phone (850, 850, 857, 950, 957 "Proton", 5790, 5810, 6210, 6230, 6280, 6510, 6710, 6750, 7210, 7230, 7250, 7270, 7280, 7290, 7510, 7520, 7730, 7750, 7780, 7100t, 7105t, 7100r, 7100v, 7100g, 7100x, 7100i, 7130e, 7130c, 7130g, 7130v, 8700c, 8700r, 8700f, 8700g, 8703e, 8707v, 8707h, 8100, 8800, 8830, 8300), Jasper S20, a Samsung smartphone (A460, A640, A707, A900, c100, c417, D500, D600, D800, D807, D830, D900, E105, E335, E700, E720, E800, E810, E820, E900, i300, i500, i550, i607, i700, i730, N270, P300, P510, T209, T319, T509, T519, T619, T629, T709, T809, u340, u520, u540, u600, u620, u740, W531, X450, X460, X480, X495, X640, X660, X700, X820, X830, Z130, Z140, Z400, Z107) or similar phone capable of displaying email or running third party software.

System Analysis

According to an embodiment, a system is provided as shown in FIG. 1. A processor 10 is provided and is adapted to communicate with at least one database 20. In some embodiments discussed below, the database may store data related to subject compliance or the validity of a subject's answers, and associated research protocols. In one embodiment the database is an evaluability database. An input device 30 is also provided to allow the subject or another person to provide input to the processor 10. The input device 30 may be a keyboard, touch sensitive screen, a microphone, a modem or other such device adapted for communication with the processor. An output device 40 is may be provided to receive and display information from the processor 10. Examples of output devices 40 include a printer, an speaker and a monitor.

In one embodiment, a portable electronic device 50 is provided and is selectively operatively coupled to the processor 10. The portable electronic device 50 can also include a processor and may serve as an alarm, an input device, an output device, an execution device for algorithms, and/or a database. In some embodiments discussed below, the database may store data related to subject compliance or the validity of a subject's answers, and associated research protocols. In one embodiment the database is an evaluability database.

In another embodiment, a portable electronic device is provided which comprises a processor 10. The portable electronic device may further comprise at least one of an input device, an output device, or a database. In some embodiments discussed below, the database may store data related to subject compliance or the validity of a subject's answers, and associated research protocols. In one embodiment the database is an evaluability database.

In one embodiment, a portable electronic device with wireless communication capability is provided, including, but not limited to Wi-Fi, NMT, AMPS/TACS/ETACS, Hicap, CDPD, Mobitex, DataTAC, GSM, iDEN, D-AMPS, IS-95/cdmaOne, PDC, CSD, PHS, GPRS, HSCSD, WiDEN, EDGE (EGPRS), W-CDMA, UMTS (3GSM), FOMA, TD-CDMA/UMTS-TDD, 1×EV-DO/IS-856, TD-SCDMA, GAN (UMA), HSPA, HSDPA, HSUPA, HSPA+, CDMA2000 1×RTT/IS-2000, UMB, UMTS Revision 8 (LTE), WiMAX, HSOPA, WiBro, Bluetooth, Infrared or Dial-Up Networking.

Compliance Analysis

Figure 2:
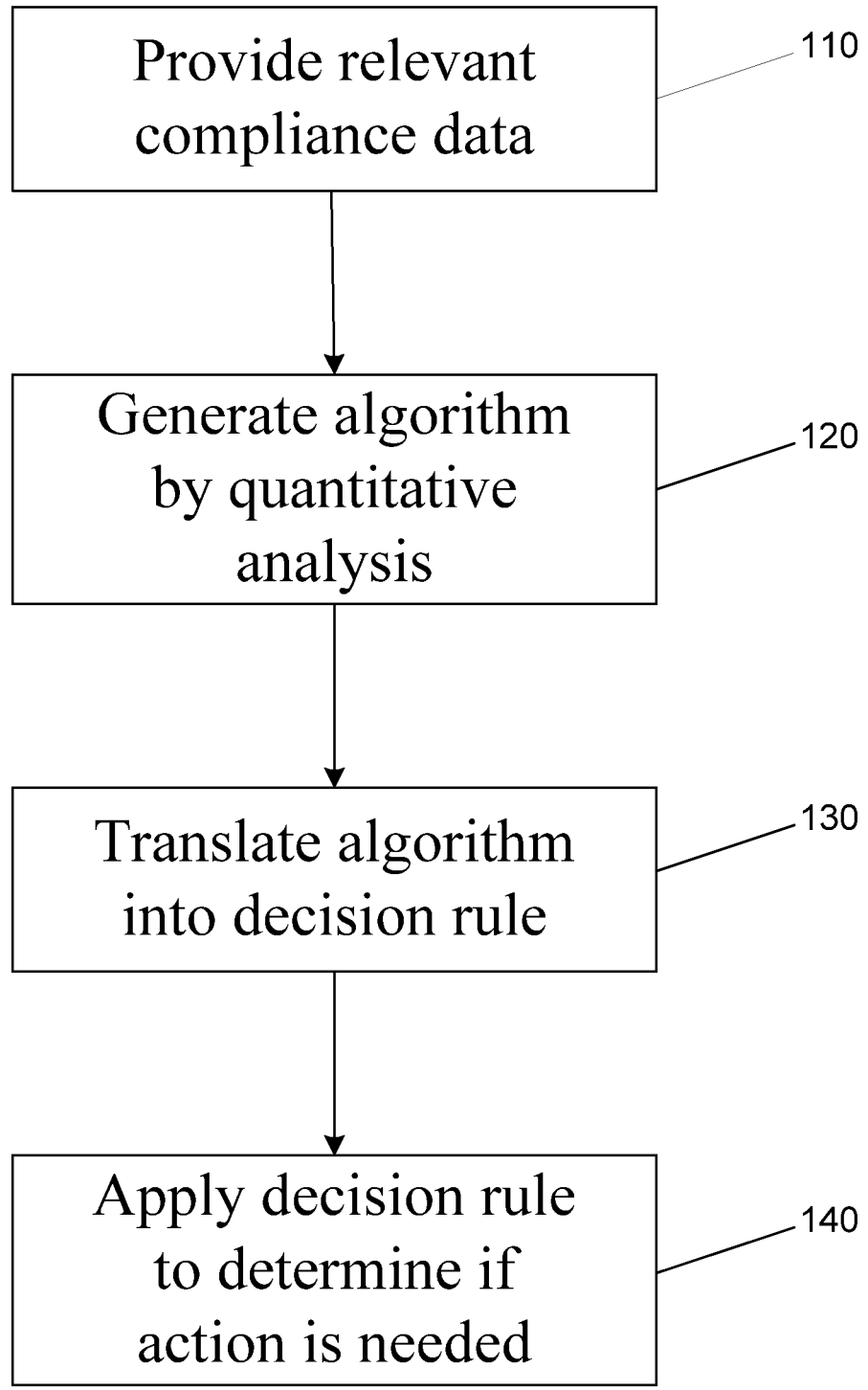
FIG. 2 is a schematic flow chart diagram illustrating a method for analyzing compliance data, according to one embodiment of the teachings of the present invention.

A flow chart illustrating another embodiment of the present invention is set forth in FIG. 2. First, relevant subject compliance data, and associated protocol data, reflecting subject compliance with research protocols in clinical trials, is provided, step 110. Optionally, only subject compliance data may be provided, as some applications may not require knowledge of associated historical protocols for use of the subject compliance data. For example, analysis of response times to questions may not require knowledge of the maximum permissible time for subjects to answer questions in earlier clinical trials.

Subject compliance data and associated protocol data may be stored in one or more databases 20 and may be identified from earlier clinical trials and/or earlier activities of a current clinical trial. An output of the present invention may include a database to provide subject compliance data and associated protocol data for later use.

The subject compliance data and associated protocol data may be specific to the type of condition or medication that is the focus of the clinical trial. For example, if the clinical trial relates to a cardiovascular condition, the data may relate to subject compliance with protocols in cardiovascular clinical trials. Likewise, if the clinical trial relates to a cardiovascular medication, the data used may relate to subject compliance with protocols in cardiovascular clinical trials. Another embodiment may optionally include subject compliance data and associated protocol data obtained from an earlier phase of the clinical trial with the compliance data of the obtained from a later phase. Alternatively, the subject compliance data and associated protocol data may not be related to the type of condition or medication that is the focus of the clinical trial.

At least one algorithm representative of the subject compliance data is generated by quantitative analysis of the compliance data, step 120. In some embodiments, multiple algorithms are generated. Some embodiments involve the application of statistical and other quantitative methods to screen existing research data for markers of, e.g., variables related to noncompliance with research protocols. In some other embodiments, the subject compliance data is also reviewed to exclude invalid data. For example, data reported by one subject that appears to be well outside a range established by all other subjects can indicate invalid data.

Examples of various types of data that may be collected according to one embodiment include variables that may represent 'non-intuitive' predictors such as gender of the subject, presence or absence of disease, severity of any disease, age of subject, ethnic background of the subject, sexual orientation of the subject, the time of the year, and the day of the week.

Quantitative analysis methods are used to distinguish, identify, and predict instances of good and poor compliance and/or instances of valid or invalid data entries. Quantitative analysis methods may include, but are not limited to, application of a variety of statistical and data mining techniques, such as logistic regression, discriminant function analysis, classification and regression trees, neural networks, and multiple linear regression to screen existing data and derive algorithms to identify markers of noncompliance with research protocols.

A variety of statistical methodologies can be used to analyze the protocol and compliance data. For example, logistic regression analyses use dichotomous and continuous variables to predict dichotomous outcome variables. For example, dichotomous outcome variables can indicate that a subject "completed" or "failed to complete" a clinical trial monitoring protocol. Discriminant function analysis relates a categorical criterion variable to dichotomous or linear predictors. Classification and Regression Trees (CART) use binary recursive partitioning to identify unique groups of subjects, such as, for example, subjects failing to complete the clinical trial protocol and subjects completing the protocol with minimal corrective feedback regarding their compliance with the clinical trial protocol. Neural network approaches to pattern recognition examine data for patterns and classify certain patterns of data based on the probability that they lead to a given outcome. Multivariate Regressive Splines (MARS) build flexible regression models, including interactions, by fitting separate splines to distinct intervals of the predictor variables.

Other nonparametric and parametric statistical approaches can also be applied to the prediction of subject noncompliance with clinical trial protocols and/or survey protocols.

A variety of predictor and criterion variables can be used. Predictor variables can range between basic demographic characteristics, such as, for example, gender, to specific clinical trial compliance related variables, such as, for example, mean latency to respond to an audible prompt from an optional portable electronic device. Similarly, criterion variables can range from subtle, such as, for example, missing some percentage of portable electronic device prompts, to severe noncompliance, such as, for example, failure to complete the clinical trial protocol. For detection of fraudulent entries, example predictor variables could include the speed or rate of entries, or an implausible or statistically unlikely pattern of answers to a set of assessment questions.

In one embodiment complex, non-intuitive interactions among multiple variables are used to optimally predict subject compliance with clinical trial protocols. That is, the markers or variables used to predict noncompliance may or may not, in and of themselves, be related to noncompliance. Algorithms may rely on different variables for different subgroups. For example, subgroups can include, but are not limited to, men and women, older or younger subjects, or subjects late or early in the clinical trial. The algorithms may also identify different combinations of variables working only in tandem. Thus, the variables alone may not be directly, simply, or obviously related to noncompliance. The algorithms may use complex and non-intuitive combinations of predictors to predict subject noncompliance with clinical trial protocols.

For example, individual cases may be collected and identified, where compliance or validity has deteriorated. The data from these cases may then be compared to cases where compliance or validity was maintained. The compliance or validity of the data from a particular case (the "dependent variable" to be predicted), is predicted on the basis of a set of other "predictor" variables collected from the trial participants. These "predictor" variables may include characteristics of the person (e.g., gender, age, ethnicity, credit score, address), characteristics of the trial (e.g., therapeutic or clinical category, marketing survey, or political polling), as well as variables related to the participant's current status in the trial (e.g., tenure in the study, trend in compliance up to this point). In logistic regression, the compliance "outcome" is predicted from such variables, and combinations and interactions of variables (i.e., where one variable modifies the effect of another; e.g., where past compliance is predictive for men but not women) can be detected. The statistical analysis estimates how predictable the outcome is, and yields an equation for predicting noncompliance in future cases. Discriminant function analyzes data with pre-defined groups (in this case, compliant vs non-compliant), and analyzes continuous variables as the dependent variables, and yields an equation for estimating the probability that any new case belongs to each of the subgroups, based on its values on the dependent variables. Like logistic regression, CART also aims to predict a dichotomous dependent variable from a set of predictors, but does so by recursive partitioning on the basis of the predictors, taken one at a time. So, for example, CART may recognize that men are less compliant than women, and form two subsets based on gender. It then would identify past compliance as a predictor within the male subset, while searching independently for the best next predictor among the women. In this sense, effect modifiers and interactions are inherently incorporated in CART's approach. In these examples, compliance or validity may be construed as a dichotomous yes/no quantity.

In some embodiments compliance may be framed as a quantitative continuum (e.g., the proportion of assessments completed, or a composite quantity of proportion of assessments plus the number of instances in which the respondent suspended prompting by an electronic diary). In these embodiments, multivariate regression may be used, yielding an equation with coefficients on the predictor variables to estimate the likely value of the compliance or validity index. Similarly, MARS would achieve optimal differentiation of the quantitative outcome by recursive partitioning of the sample on the basis of the predictor variables, fitting spline predictors, which are more flexible than linear predictors.

In another embodiment, neural network approaches may be used to analyze the collected data, which rely on complex pattern recognition algorithms to "learn" how to identify pre-specified cases and non-cases (i.e., compliant vs noncompliant participants, valid vs invalid responses), and then apply the pattern recognition to new cases.

In another embodiment context-specific algorithms are used to maximize predictive utility. That is, different algorithms can be derived for different groups of subjects, such as, for example, subjects with cardiovascular or central nervous system diseases, or for subjects in short versus long studies. As a result, this embodiment avoids assuming that any given set of variables will be equally predictive of clinical trial noncompliance for all types of conditions or diseases or for all types of subjects.

Yet another embodiment, provides for novel quantitative analyses to be incorporated into the development of algorithms to further improve their predictive validity. Specifically, the algorithms can be subject to continuous improvement as more data become available for analysis, either within an individual clinical trial or accumulating across clinical trials.

According to a further embodiment, algorithms can be used to determine appropriate feedback to both subjects and research staff regarding compliance with the protocol. For example, a computer program can implement decision rules based on these algorithms, and automatically determine appropriate feedback or action by the personnel involved in conducting the clinical trial. An advantage of these embodiments is that, because the algorithms and decisions are based on formal, empirical, and quantitative criteria, they remove the subjective element in these decisions, which in turn minimizes the potential for bias.

Other advantages provided by the disclosed embodiments include provisions for the application of algorithms for giving systematic feedback to subjects, research sites, and clinical trial sponsors conducting clinical trials using clinical trials.

Once one or more algorithms have been derived from analysis of existing data, the algorithms can be translated into specific decision rules, step 130. Decision rules are essentially reformatted algorithms that can be applied to current subject compliance data to determine whether action is needed, step 140. Decision rules may determine a threshold of compliance or a threshold of noncompliance. Optionally, a decision rule may identify a spectrum of noncompliance, from minor noncompliance needing only corrective feedback, to significant noncompliance requiring subject removal from the clinical trial. Decision rules may be based on the specific dependent variable used to derive the algorithm or may be based on one or more differing variables.

For example, a subject who, within the first two days of the clinical trial, does not respond to more than 20% of prompted inquiries and either suspends prompting more than once or indicates he/she is napping more than once may be identified as failing to comply with the research protocol. As another example, subjects who suspend prompting at least twice, and whose total time of such suspension exceeds 2 hours, might be determined to be likely noncompliant, regardless of their overall performance. For purposes of illustration, one sample decision rule may be stated as:

Display noncompliance remediation message to clinical staff if: [0.32(ratio of missed random prompts)+0.45 (mean number of minutes spent time delaying assessments per day/100)+0.80(mean number of hours spent in sleep each night over past 7 days/10)]>1 where if noncompliance is determined by this decision rule, an action, such as sending a specific message to the clinical staff is recommended.

For example, in the present example, the message "Subject is not following the protocol as required, resulting in substantial missed assessments. Call subject." may be sent to the research staff.

According to one embodiment, criteria for identifying a subject as noncompliant with the research protocol need not overlap with criteria developed for determining whether to drop a subject from the clinical trial or exclude data related to that subject from the clinical trial results. For example, the decision rule(s) related to dropping a subject from the clinical trial might be based on failed responses to audible prompts rather than on suspension of prompting.

Typically, a decision rule specifies what type of action is required and may provide specific action details. Action types include, but are not limited to, corrective, affirmative and anti-fraud actions. Action details may include the content of a message to be provided to a subject or to clinical staff.

Decision rules may be translated from algorithms that identify patterns of noncompliance data that are harbingers or leading indicators of later, more serious, noncompliance. This would allow early action to be taken based on these indicators. Such decision rules would typically be in the form of contingencies or conditions based on early compliance indicators.

Optionally, translation of algorithms to decision rules may involve human input or additional factors. For example, balancing the impact of a decision rule against the focus of the clinical trial may result in an alteration of the decision rule. For example, if subjects' heart rates are being monitored, frequency of prompting or loudness of reminder alerts may be minimized so as not to artificially raise subject heart rates. Also, clinical staff may alter decision rules based on their assessment of external factors outside of the scope of the quantitative analysis. An example may include providing more alerts to clinical staff instead of directly to subjects to provide more interaction between clinical staff and the subjects.

A decision rule may also be used to predict which subjects will fail to complete a clinical trial protocol. Therefore, a decision to rule to drop the subject from the clinical trial, or to work to improve subject performance, can be made at an early time. By providing those conducting a clinical trial with early feedback regarding subject noncompliance with a research protocol, clinical trial data quality is improved potentially saving both time and money by either improving the compliance of potentially noncompliant subjects or excluding unimprovable noncompliant subjects early in a clinical trial.

Analysis of a Subject's Reported Data.

Figure 3:
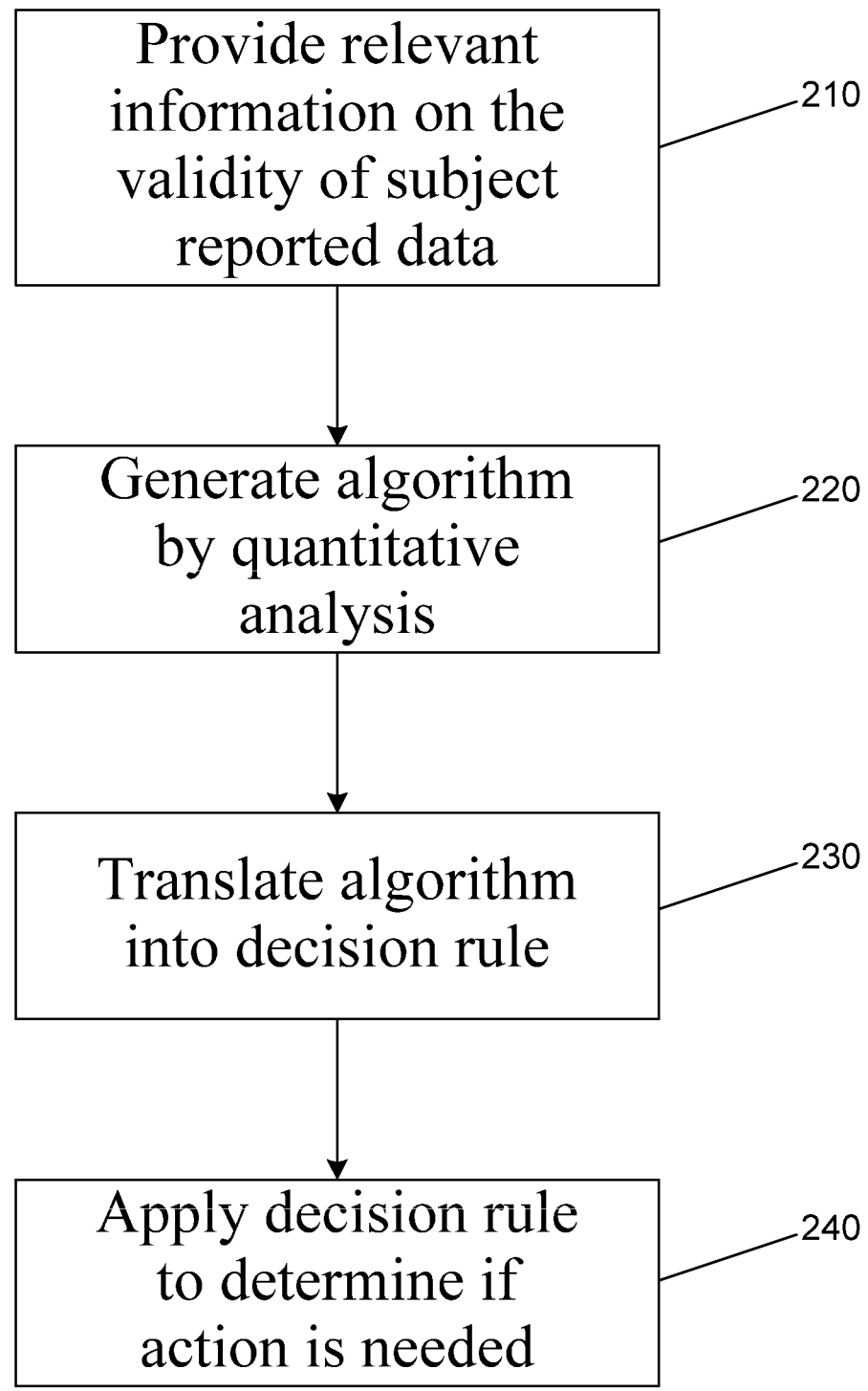
FIG. 3 is a schematic flow chart diagram illustrating a method for analyzing the validity of subject reported data, according to one embodiment of the teachings of the present invention.

A flow chart illustrating the method of an alternative embodiment is set forth in FIG. 3 First, relevant information on the validity of a subject's reported data, and associated protocol data, reflecting subject truthfulness or care in research protocols, such as in surveys, is provided, step 210. Optionally, only subject validity data may be provided, as some applications may not require knowledge of associated historical protocol for analysis of the subject validity data. For example, analysis of response times to questions may not require knowledge of the maximum permissible time for subjects to answer questions in earlier surveys.

Subject validity data and associated protocol data may be stored in one or more databases 20 and may be identified from earlier surveys and/or earlier activities of a current survey. An output of the present invention may include a database to provide subject survey data and associated protocol data for later use.

The subject validity data and associated protocol data may be specific to the goal or objective that is the focus of the survey. Surveys include market research surveys, opinion surveys, opinion polling, workplace satisfaction survey or political polling. For example, if the survey relates to a workplace satisfaction, the data may relate to subject validity data in regards to questions about morale. Likewise, if the survey relates to a market research survey, the data used may relate to the validity of subject reported data, in regard to their preference for a particular good, service or media outlet. In another embodiment validity markers may be optionally combined with associated protocol data obtained from an earlier phase of the survey with the validity data of a present analysis. In a related embodiment, the prior validity markers and/or the prior protocol data may not be related to the type of good, service, or media outlet that is the focus of a present survey.

At least one algorithm representative of the validity of subject reported data is generated by quantitative analysis of the validity data, step 220. In some embodiments, multiple algorithms are generated. In one embodiment the application of statistical and other quantitative methods is used to screen existing research data for markers of (e.g., variables) the validity of subject reported data within research protocols. In some embodiments, the subject validity data is also reviewed to exclude invalid data. For example, data reported by one subject that appears to be well outside a range established by all other subjects may indicate invalid data.

Examples of various types of data that may be collected according to one embodiment include variables that may represent 'non-intuitive' predictors such as gender of the subject, age of subject, income level of the subject, religious affiliation of the subject, religious fervor of the subject, education level of the subject, ethnic background of the subject, the time of the year, and the day of the week.

Quantitative analysis methods are used to distinguish, identify, and predict instances of when the subject reported data is valid or invalid. The quantitative analysis methods may include, but are not limited to, application of a variety of statistical and data mining techniques, such as logistic regression, discriminant function analysis, classification and regression trees, neural networks, and multiple linear regression to screen existing data and derive algorithms to identify markers of invalid subject reported data within research protocols.

The validity of the data reported by subjects participating in a survey directly affects the survey's quality and utility to the sponsor. The validity of responses to a survey places an upper limit on its reliability.

Logistic regression analyses use dichotomous and continuous variables to predict dichotomous outcome variables. For example, dichotomous outcome variables can indicate "valid" or "invalid" answers to a survey. Discriminant function analysis relates a categorical criterion variable to dichotomous or linear predictors. Classification and Regression Trees (CART) use binary recursive partitioning to identify unique groups of subjects, such as, for example, subjects failing to complete the survey or and subjects providing different answers to a series of questions designed to examine the same construct. Neural network approaches to pattern recognition examine data for patterns and classify certain patterns of data based on the probability that they lead to a given outcome. Multivariate Regressive Splines (MARS) build flexible regression models, including interactions, by fitting separate splines to distinct intervals of the predictor variables. Other nonparametric and parametric statistical approaches can also be applied to the prediction of the validity of subject reported data in survey protocols.

A variety of predictor and criterion variables can be used. Predictor variables can range between basic demographic characteristics, such as, for example, gender, age, ethnicity, geographical location, income level, to specific survey related variables, such as, for example, mean latency to respond to an audible prompt from an optional portable electronic device. Similarly, criterion variables can range from subtle, such as, for example, missing some percentage of portable electronic device prompts, to severe validity issues, such as, for example, failure to complete the survey. For detection of fraudulent entries, example predictor variables could include the speed or rate of entries, or an implausible or statistically unlikely pattern of answers to a set of assessment questions.

In one embodiment complex, non-intuitive interactions among multiple variables are used to optimally predict the validity of subject reported data within survey protocols. That is, the markers or variables used to predict invalidity may or may not, in and of themselves, be related to the invalid data. Algorithms may rely on different variables for different subgroups. For example, subgroups can include, but are not limited to, men and women, older or younger subjects, or subjects that are late or early entries in the survey. The algorithms may also identify different combinations of variables working in tandem or synergistically. Thus, individual variables may not be directly, simply, or obviously related to the invalid data. The algorithms may use complex and non-intuitive combinations of predictors to predict the validity or invalidity of subject reported data within surveys.

In one aspect methods for assessing or predicting the reliability of a survey is provided for by analyzing validity markers. In one embodiment a subject's responses to questions or prompts are analyzed for patterns indicative of inappropriate, invalid or unreliable responses. In one embodiment said analysis is based on benchmarks and/or at least one database developed from at least one data set (such as the present data set comprising at least one event, or multiple events from the present survey). In another embodiment said analysis is based on benchmarks and/or at least one database developed from more than one data set (such as the present data and at least one historic data set, comprising at least one event, or multiple events from a survey).

In another embodiment, a subject's responses to questions or prompts are analyzed to detect inconsistent or contradictory responses. In one embodiment the subject may be prompted to answer multiple questions, wherein some questions pose essentially the same query and are designed to provide information on the consistency of the subject's responses. In another embodiment the subject may be prompted to answer multiple questions, wherein some questions are designed to generate implausible response patterns in order to assess whether the subject is attentive and/or responding in a contradictory pattern. In one embodiment a subject's consistency is analyzed within a single survey. In another embodiment a subject's consistency is analyzed between two or more surveys.

In another embodiment, a subject's responses to questions or prompts are analyzed to detect patterns of latency or delay in response time. In one embodiment the subject's response time is analyzed in comparison to statistical benchmarks based on the distribution of response times for other subject in a present survey in order to detect invalid responses. In another embodiment the subject's response time is analyzed in comparison to statistical benchmarks based on the distribution of response times for subjects in a historic survey in order to detect invalid responses.

In another embodiment, a subject's responses to questions or prompts are analyzed, wherein the subjects are participants in a panel or cohort survey, such as a survey. For example the subjects may be surveyed repeatedly at separate time points as part of an on-going or longitudinal survey. In one embodiment a subject's responses may be analyzed to compare their past responses for consistency, pattern of response, or latency of response.

In another embodiment context-specific algorithms are used to maximize predictive utility. That is, different algorithms can be derived for different groups of subjects, such as, for example in workplace satisfaction surveys, subjects may be grouped by job classification, unionization status, or level of management responsibility. The derivation of group specific algorithms avoids the pitfalls of assuming that any given set of variables will be equally predictive of the validity of subject reported data for all types of surveys or for all types of subjects.

Another embodiment provides for novel quantitative analyses to be incorporated into the development of algorithms to further improve their predictive validity. Specifically, the algorithms may be subject to continuous improvement as more data become available for analysis, such as when an individual enters a survey and/or by accumulating data across multiple surveys.

According to a further embodiment, algorithms can be used to determine appropriate feedback to both subjects and research staff regarding the validity of subject reported data in a survey. For example, a computer program can implement decision rules based on these algorithms, and automatically determine appropriate feedback or action by the personnel involved in conducting the survey. Because the algorithms and decisions are based on formal, empirical, and quantitative criteria, they remove the subjective element in these decisions, which in turn minimizes the potential for bias. In some embodiments these algorithms may be used in applications within existing or yet to be developed processes for giving systematic feedback to subjects, research sites, and survey sponsors conducting surveys using third party contractors.

Once one or more algorithms have been derived from analysis of existing data, the algorithms can be translated into specific decision rules, step 230. Decision rules are essentially reformatted algorithms that can be applied to current validity markers, to determine whether action is needed, step 240. Decision rules may determine a threshold of validity or a threshold of invalidity. Optionally, a decision rule may identify a spectrum of invalidity, from minor invalidity needing only corrective feedback, to significant invalidity requiring subject removal from the survey. Decision rules may be based on the specific dependent variable used to derive the algorithm or may be based on one or more differing variables.

For example, a subject who, within the initial stages of a survey, does not respond to more than 20% of prompted inquiries and either suspends prompting more than once or indicates he/she is unavailable more than once may be identified as failing to comply with the research protocol. As another example, subjects who suspend prompting at least twice, and whose total time of such suspension exceeds 2 hours, might be determined to be report invalid data, regardless of their overall performance. For purposes of illustration, one sample decision rule may be stated as:

Display invalid remediation message to survey staff if: [0.32(ratio of missed random prompts)+0 45(mean number of minutes spent time delaying assessments per day/100)+0 80(mean number of hours spent in sleep each night over past 7 days/10)]>1 where if invalidity is determined by this decision rule, an action, such as sending a specific message to the survey staff is recommended. For example, in the present example, the message "Subject is not following the protocol as required, resulting in substantial missed assessments." Intervention with the subject may be determined to be the appropriate action.

According to an embodiment, criteria for identifying a subject as reporting invalid data within the research protocol need not overlap with criteria developed for determining whether to drop a subject from the survey or exclude data related to that subject from the survey results. For example, the decision rule(s) related to dropping a subject from the survey might be based on failed responses to audible prompts rather than on suspension of prompting.

Typically, a decision rule specifies what type of action is required and may provide specific action details. Action types include corrective, affirmative and anti-fraud actions. Action details may include the content of a message to be provided to a subject or to survey staff.

Decision rules may be translated from algorithms that identify patterns of invalid data that are harbingers or leading indicators of later, more serious, invalidity. This would allow early action to be taken based on these indicators. Such decision rules may be in the form of contingencies or conditions based on early indicators of invalidity.

Optionally, translation of algorithms to decision rules may involve human input or additional factors. For example, balancing the impact of a decision rule against the focus of the survey may result in an alteration of the decision rule. For example, if subjects' opinion of an audio, visual or mixed media presentation is being surveyed, the frequency of prompting or loudness of reminder alerts may be minimized so as not to artificially distract the subject. Also, survey staff may alter decision rules based on their assessment of external factors outside of the scope of the quantitative analysis. An example may include providing more alerts to survey staff instead of directly to subjects to provide more interaction between survey staff and the subjects.

A decision rule may also be used to predict which subjects will fail to complete a survey. Therefore, a decision to drop the subject from the survey, or to work to improve subject performance, can be made at an early time, such as initial entry. By providing personnel conducting a survey with early feedback regarding the validity of subject reported data within a research protocol, the resulting survey data quality may be improved. Early feedback potentially saves both time and money by either improving the validity of data reported by potentially unreliable subjects or excluding unimprovable subjects who report invalid data, early in a survey.

A decision rule may also be used to identify a subject in a survey whose data is invalid, based on a pattern of responses. The decision rule may be used to invalidate the subject's data or to prompt an interviewer or electronic device administering or assisting in the administration of the interview to query the subject about the questionable, or potentially invalid data.

Fraud

The generation of a fraud detection algorithm can take many forms. The psychometric properties of the scale itself could be used to identify potentially fraudulent responses. These response may be either intentionally or unintentionally fraudulent. For example, according to one embodiment, item response theory uses known properties of individual items within an assessment to estimate the probability that an observed pattern of responses is valid. Therefore, a subject answering yes to the question "My headaches are completely debilitating" has a low probability of also answering yes to the question "My headaches are a minor inconvenience" such that observing this pattern of responses could be indicative of fraud.

According to a further embodiment, the detection of fraudulent or invalid entries in subject-supplied data may be performed similarly to the methods described herein. For example, the analysis could be based on statistical properties of the responses themselves. Thus, as an example, analysis might indicate that when the standard deviation across subject responses on a particular questionnaire are less than 1.0, fraudulent or invalid completion is highly likely.

The content of subjects' responses could optionally be used as a source of data for the fraud detection algorithms if the responses are invariant or relatively invariant. For example, a subject answering 'yes' to all questions, even when the logical content of the questions would suggest some alternating pattern of appropriate responses.

Analysis of fraud could also be based on particular combinations of responses. For example, subjects who answered that they took pain medication five or more times daily, but who elsewhere indicated either that pain seventy was 4, on a scale of 1 to 10, or that pain frequency was 'infrequent' or 'rare', might be flagged as cases likely to be invalid. In another example, subjects that indicate that they strongly favor the policies of a single political party yet also indicate that they only vote for candidates from opposing parties might be flagged as cases likely to be invalid. The response patterns determined to represent potentially fraudulent data need not be logically inconsistent or intuitively invalid. Rather, they are determined to represent potentially fraudulent data based on statistical analysis comparing valid and invalid response profiles. Therefore, questions posed to subjects can be tailored to provide opportunities for the subject to contradict, or appear in disagreement with, responses to earlier questions.

In an alternative embodiment, the posing of questions providing opportunities to contradict earlier responses can be interactive. For example, further questions providing opportunities to contradict earlier responses can be posed only if a response to a question appears unusual or if a decision rule indicates earlier indications of potential fraud.

As a further example, the time required for a subject to respond to items could be the foundation for the generation of fraud detection algorithms. For example, compliance or validity data could be used to estimate the mean length of time subjects take to respond to certain items. In such an example, response latencies less than two standard deviations below those norms could be the basis of identifying the responses as potentially fraudulent. For example, if a question contains 25 words and subjects take an average of 8 seconds to answer the question, responses of less than 1 second could be identified as potentially fraudulent.

Alternatively, the portable electronic device could capture certain ecological data such as temperature, light levels or ambient noise level, or physiological data, such as heart rate, blood pressure, subject's temperature, skin electroconductivity, perspiration, or rate of blinking. This data may be suggestive of a particular location, subjective, or physical state, which is inconsistent with the subject's responses, suggesting possible fraud. In one embodiment this data is incorporated into an evaluability database as validity information.

In an alternative embodiment, subjects can be included in the clinical trial or survey for the purpose of providing fraudulent data. For example, in a group of 100 subjects, 20 subjects may be asked to provide fraudulent data. By having such fraudulent data among data provided by the subjects, quantitative analysis of can be used to ensure the resulting algorithms and decision rules detect the known fraudulent entries. In the event other subjects are also fraudulently recording data without the knowledge of the clinical or survey staff, the algorithms and decision rules will likely also detect such unknown fraudulent activity. According to various embodiments, each of the above variations for detection of fraud can be used individually, sequentially or in combination.

Portable Electronic Devices

According to one aspect of the invention, a system for automated processing of data collected via a portable electronic device is provided, such as a laptop computer, a handheld computer or smart-phone. In this embodiment, the portable electronic device or system is designed to prompt a subject for information and/or collect information as recorded by the subject with or without prompting. It is envisioned that in some embodiments each subject in the clinical trial or survey is provided with a portable electronic device. The portable electronic device can be used to collect compliance and/or validity relevant information, such as the number of data entry episodes, missed data entry occasions (e g, instances where the portable electronic device prompts for data, but the subject fails to respond), delays in data entry, or the number of times an entry was changed. A database of these variables may be processed according to the decision rules to guide the actions of the portable electronic device as described in detail in the copending U.S. patent application Ser. No. 09/825,533, titled "System for Clinical Trial Subject Compliance", which is herein incorporated by reference in its entirety.

In one embodiment the portable electronic device may also adapted to communicate with another computer to allow the clinical or survey staff to consolidate the data from all subjects in the clinical trial or survey, respectively, into one location for review or processing. In some embodiments the portable electronic device will also be adapted to communicate with at least one other computer via a wireless connection or via a wired connection, including the use of a modem and/or a network, such as a LAN or the Internet. For example, by the use of the Internet, a dial-up modem, or wireless connection, a subject may submit information from the portable electronic device to the clinical or survey staff from the subject's home. Wireless communication may occur by any suitable data transfer format, including but not limited to, Bluetooth, wife (e.g. 802.11g or 802.11b), NMT, AMPS/TACS/ETACS, Hicap, CDPD, Mobitex, DataTAC, GSM, iDEN, D-AMPS, IS-95/cdmaOne, PDC, CSD, PHS, GPRS, HSCSD, WiDEN, EDGE (EGPRS), W-CDMA, UMTS (3GSM), FOMA, TD-CDMA/UMTS-TDD, 1×EV-DO/IS-856, TD-SCDMA, GAN (UMA), HSPA, HSDPA, HSUPA, HSPA+, CDMA2000 1×RTT/IS-2000, UMB, UMTS Revision 8 (LTE), WiMAX, HSOPA, WiBro.

In one embodiment, a portable electronic device or a computer is adapted to communicate with clinical trial equipment used for measuring, monitoring, controlling or recording data or a process of the clinical trial. Examples of such processes include administration of medication or monitoring of heart rates. In some embodiments the portable electronic device or a computer can automatically record desired data for incorporation in the clinical trial data or compliance data.

In an alternative embodiment, a portable electronic device or a computer is adapted to communicate with survey equipment used for measuring, monitoring, controlling or recording data or a process of a survey. Examples of such processes include live monitoring of viewers opinions of a political speech, wherein the portable electronic device communicates opinions to a central computer, which can analyze and display the aggregate results. In some embodiments the portable electronic device or a computer can automatically record desired data for incorporation in the survey data or validity data.

In another aspect of the invention, a system for automated processing of data collected via a land line (such as a LAN line, a T1, T2, or T3 line, a DSL line, a co-axial cable, an ethernet cable, an optical cable, or an aluminum line, or a copper line) is provided, such as from a non-portable electronic device, including, but not limited to a, desktop computer, a smart-phone placed in a stationary dock, a portable electronic device placed in a stationary dock, or a non-portable phone system (such as a wall phone or a desktop phone).

In one embodiment a portable electronic device or a non-portable electronic device is connected to a central server. A subject may interact with the central server via an interactive voice response (IVR) system, which is a phone technology that allows a computer to detect voice and touch tones using a normal phone call. The IVR system can respond with pre-recorded or dynamically generated audio to further direct callers on how to proceed. IVR systems can be used to control almost any function where the interface can be broken down into a series of simple menu choices. In one example a may call a number that is answered by an IVR system. The IVR system plays a pre-recorded message and asks the subject to select options from a voice menu. This provides the caller with the ability to automatically participate in a poll, survey or clinical trial without the need for a human operator. In one embodiment a pre-recorded voice prompt is played and the caller presses a number on a telephone keypad to select an option—i.e. "press 1 for yes, press 2 for no". In another embodiment the IVR system may use speech recognition software to interpret a subject's spoken answer such as "yes", "no", more complex words, sentences and business names, or a number as a valid response to a voice prompt. In one embodiment the IVR system may measure and/or record validity markers, including but not limited to, the length of a delay before a subject responds to a prompt, length of response, stress levels in a subject's voice, whether the subject changes a response and what the response was changed from.

In another embodiment, a paper form, such as a case report form, can be used by the subject to record data. The data can then be entered into a database by the use of a portable electronic device or other computer at an appropriate time, such as by scanning the document or by human data entry. Examples of case report forms include hand-written forms and forms that allow for machine readable marks to be made, enabling automated scanning of the case report forms during entry of the data into a computer.

In another embodiment, a touch screen or key pad can be used by the subject to record data. The data can then be entered into a database by the use of a portable electronic device or other computer at an appropriate time, such as by human data entry using a stylus, a finger or buttons to enter data. A subject can respond to text or audio prompts to select an answer from one or more options, or to enter a subject specified response. In one embodiment validity markers may be measured and/or recorded, including but not limited to, the length of a delay before a subject responds to a prompt, length of response, whether the subject changes a response, what the response was changed from and number of times an answer was changed.

In an alternative embodiment, methods or algorithms of the present invention may be incorporated in instructions recorded on a medium suitable for use in an electronic device, such as a computer, computer network server or a portable electronic device. The medium can include, for example, a hard disk, RAM medium, a Flash drive, a diskette, CD-ROM or other optical or magnetic storage medium. The instructions can optionally be stored on a server that can be remote from the subject, clinical staff or survey staff member.

According to another embodiment of the invention, the server can provide data to be displayed. Data may be displayed at the server itself or be transmitted to another location, such as via a land line or wireless access to the server, including, but not limited to, a LAN line, wife or access to the Internet. The data can be processed to provide a graphical display to interested parties. Examples of individuals who may be interested in viewing the graphical representation of compliance data include, but are not limited to, a site coordinator (who may be interacting with the subject), a clinical research organization (who may be responsible for study execution across a number of research locations), other agencies interested in the collection of the data, or the sponsor of the research. Other, examples of individuals who may be interested in viewing the graphical representation of reliability data, but are not limited to, a survey site coordinator (who may be interacting with the subject), a survey research organization (who may be responsible for study execution across a number of research locations), a marketing researcher, an employer or a survey sponsor.

According to another embodiment, the server can provide ongoing aggregation of data across subjects to speed the time required to combine, clean, and make available final data.

In another embodiment, an evaluability database, such as an Excel™ database, may be compiled using validity markers collected from one or more surveys. The validity database may be used to predict validity of reported data from any survey participant in a future survey, predict continued reliability in an ongoing survey and/or identify unreliability in a survey. The evaluability database may be used by sponsors of a survey to select subjects that will most likely yield accurate, useful results without wasting resources.

The evaluability database may contain many different metrics on subject performance, as described above. For example, for particular survey sites, the validity information in the database may list the historic ability of each site to reach enrollment targets, how consistent each site was in previous surveys with respect to training, the validity of subject reported data, and regular trial monitoring and other data indicative of reliability and therefore overall performance.

In this manner, a sponsor of a survey may identify highly qualified sites, such as survey sites that historically produce adequate, accurate and reliable data, for conducting a survey, and avoid wasting resources on sites that will not tend to produce usable results, such as non-performing survey sites.

For example, the performance of targeted survey sites in previous surveys may be tracked according to one embodiment, in several different ways. The resulting database allows for statistical analysis and identification only those survey sites that have been able to meet their enrollment targets and excel in producing valid subject reported data within research protocols in other surveys. Selected survey sites may then be ranked in a given category to identify the premier survey sites that are most likely to succeed in a proposed survey.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer implemented method for improving clinical trial data quality, comprising steps of:
   obtaining compliance information from a subject in said clinical trial on a portable electronic device, wherein said compliance information comprises data on timeliness in answering a question or responding to a prompt by said subject;
   receiving on a server, over a network from said portable electronic device said compliance information;
   applying a decision rule to said compliance information;
   determining, based at least on application of said decision rule to said compliance information, that an action should be taken;
   identifying a type of action automatically; and
   displaying said type of action on an electronic device, wherein said type of action is displayed to a subject, a research site, a sponsor or a clinical trial staff, thereby improving clinical trial data quality.

2. The computer implemented method of claim 1, wherein said clinical trial is a drug trial involving humans.

3. The computer implemented method of claim 1, wherein said portable electronic device is a handheld computer provided with a display and a data input feature or a cell phone.

4. The computer implemented method of claim 2, wherein said compliance information further comprises completeness.

5. The computer implemented method of claim 2, wherein said network is a wireless network.

6. The computer implemented method of claim 1, wherein said decision rule is a reformatted algorithm.

7. The computer implemented method of claim 6, wherein said algorithm is representative of said compliance information.

8. The computer implemented method of claim 6, wherein said algorithm is generated by quantitative analysis of said compliance information.

9. The computer implemented method of claim 1, wherein said decision rule determines a threshold of compliance or a threshold of noncompliance.

10. The computer implemented method of claim 1, wherein said action comprises corrective feedback, calling said subject, or dropping said subject from said clinical trial.

11. A non-transitory computer-readable medium suitable for use in an electronic device, said medium comprising instructions that, when executed by said electronic device, cause said electronic device to perform:
   receiving compliance information from a subject in a clinical trial, wherein said compliance information comprises data on timeliness in answering a question or responding to a prompt by said subject;
   applying a decision rule to said compliance information;
   determining, based at least on application of said decision rule to said compliance information, that an action should be taken;
   identifying a type of action automatically; and
   displaying said type of action on an electronic device, wherein said type of action is displayed to at least one of said subject, a research site, a sponsor or a clinical trial staff, thereby improving clinical trial data quality.

12. The medium of claim 11, wherein said clinical trial is a drug trial involving humans.

13. The medium of claim 11, wherein said compliance information further comprises completeness.

14. The medium of claim 11, wherein said decision rule is a reformatted algorithm.

15. The medium of claim 14, wherein said algorithm is representative of said compliance information.

16. A computer system comprising an electronic device, wherein said electronic device comprises a non-transitory computer-readable medium comprising instructions that, when executed by said computer system, cause said computer system to perform:
   receiving compliance information from a subject in a clinical trial, wherein said compliance information comprises data on timeliness in answering a question or responding to a prompt by said subject;
   applying a decision rule to said compliance information;
   determining, based at least on application of said decision rule to said compliance information, that an action should be taken;
   identifying a type of action automatically; and
   displaying said type of action on an electronic device, wherein said type of action is displayed to at least one of said subject, a research site, a sponsor or a clinical trial staff thereby improving clinical trial data quality.

17. The system of claim 16, wherein said clinical trial is a drug trial involving humans.

18. The system of claim 16, wherein said compliance information further comprises completeness.

19. The computer implemented method of claim 1, wherein said decision rule identifies noncompliance within a spectrum of noncompliance.

20. The computer implemented method of claim 19, wherein said noncompliance is minor noncompliance.

21. The computer implemented method of claim 20, wherein said action is a corrective feedback.

22. The computer implemented method of claim 19, wherein said noncompliance is a significant noncompliance.

23. The computer implemented method of claim 22, wherein said action is to drop said subject from said clinical trial.

24. The computer implemented method of claim 1, wherein said electronic device is a portable electronic device.

25. The medium of claim 14, wherein said algorithm is generated by quantitative analysis of said compliance information.

26. The medium of claim 11, wherein said decision rule determines a threshold of compliance or a threshold of noncompliance.

27. The medium of claim 26, wherein said action comprises at least one of corrective feedback, calling said subject, or dropping said subject from said clinical trial.

28. The medium of claim 11, wherein said decision rule identifies noncompliance within a spectrum of noncompliance.

29. The medium of claim 28, wherein said noncompliance is minor noncompliance.

30. The medium of claim 29, wherein said action is a corrective feedback.

31. The medium of claim 28, wherein said noncompliance is a significant noncompliance.

32. The medium of claim 31, wherein said action is to drop said subject from said clinical trial.

33. The system of claim 16, wherein said decision rule is a reformatted algorithm.

34. The system of claim 33, wherein said algorithm is representative of said compliance information.

35. The system of claim 33, wherein said algorithm is generated by quantitative analysis of said compliance information.

36. The system of claim 16, wherein said decision rule determines a threshold of compliance or a threshold of noncompliance.

37. The system of claim 36, wherein said action comprises at least one of corrective feedback, calling said subject, or dropping said subject from said clinical trial.

38. The system of claim 16, wherein said decision rule identifies noncompliance within a spectrum of noncompliance.

39. The system of claim 38, wherein said noncompliance is minor noncompliance.

40. The system of claim 39, wherein said action is a corrective feedback.

41. The system of claim 38, wherein said noncompliance is a significant noncompliance.

42. The system of claim 41, wherein said action is to drop said subject from said clinical trial.

* * * * *